United States Patent
Jackson et al.

(10) Patent No.: US 7,238,314 B2
(45) Date of Patent: Jul. 3, 2007

(54) POLYMER TRANSFER APPARATUS, METHODS, AND COMPOSITE WEBS

(75) Inventors: Byron M. Jackson, Forest Lake, MN (US); Randall L. Alberg, Maplewood, MN (US); Dennis L. Becker, Vadnais Heights, MN (US); Roger D. Pavlis, Hudson, WI (US); Leigh E. Wood, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 10/387,699

(22) Filed: Mar. 13, 2003

(65) Prior Publication Data

US 2004/0178544 A1    Sep. 16, 2004

(51) Int. Cl.
*B29C 41/26*    (2006.01)
*B29C 41/44*    (2006.01)
*B29C 41/46*    (2006.01)

(52) U.S. Cl. ................. 264/214; 264/173.1; 264/177.1
(58) Field of Classification Search ................. 264/214
See application file for complete search history.

(56) References Cited

U.S. PATENT DOCUMENTS

| | | |
|---|---|---|
| 2,919,467 A | 1/1960 | Mercer |
| 3,085,292 A | 4/1963 | Kindseth |
| 3,276,944 A | 10/1966 | Levy |
| 3,338,992 A | 8/1967 | Kinney |
| 3,341,394 A | 9/1967 | Kinney |
| 3,386,876 A | 6/1968 | Wyckoff |
| 3,394,431 A | 7/1968 | Nalle, Jr. |
| 3,502,538 A | 3/1970 | Petersen |
| 3,502,763 A | 3/1970 | Hartmann |
| 3,505,157 A | 4/1970 | Fields et al. |
| 3,515,778 A | 6/1970 | Fields et al. |
| 3,542,615 A | 11/1970 | Dobo et al. |
| 3,632,269 A | 1/1972 | Doviak et al. |
| 3,666,609 A | 5/1972 | Kalwaites et al. |
| 3,692,618 A | 9/1972 | Dorschner et al. |
| 3,881,381 A | 5/1975 | Kalwaites |
| 3,899,803 A | 8/1975 | Brumlik |
| 3,913,510 A | 10/1975 | Larsen |
| 4,062,995 A | 12/1977 | Korpman |
| 4,183,121 A | 1/1980 | Cousins |

(Continued)

FOREIGN PATENT DOCUMENTS

| | | |
|---|---|---|
| EP | 0 096 458 | 12/1983 |
| EP | 0 580 073 A2 | 1/1994 |
| EP | 0 830 930 | 3/1998 |
| EP | 0 892 320 | 1/1999 |
| WO | WO 96/10481 | 4/1996 |
| WO | WO 98/55292 | 12/1998 |
| WO | WO 99/10166 | 3/1999 |
| WO | 00/07532 | 2/2000 |
| WO | WO 00/19952 | 4/2000 |
| WO | WO 00/37003 | 6/2000 |
| WO | WO 00/50229 | 8/2000 |
| WO | WO 01/47697 | 7/2001 |
| WO | WO 02/00412 | 1/2002 |
| WO | WO 03/039853 | 5/2003 |

OTHER PUBLICATIONS

U.S. Appl. No. 10/350,204, filed Jan. 23, 2003, Hinged Tab for Slot and Tab Closure System.

*Primary Examiner*—Christina Johnson
*Assistant Examiner*—Monica A Huson
(74) *Attorney, Agent, or Firm*—William J. Bond

(57) ABSTRACT

Composite webs having one or more polymeric structures located on a substrate, methods of manufacturing the composite webs, and systems for manufacturing the composite webs are disclosed. The polymeric structures are formed using thermoplastic compositions deposited into one or more depressions on a forming tool. The forming tool is maintained at a temperature that is below the melt processing temperature of the thermoplastic composition.

16 Claims, 19 Drawing Sheets

U.S. PATENT DOCUMENTS

| | | |
|---|---|---|
| 4,223,059 A | 9/1980 | Schwarz |
| 4,329,309 A | 5/1982 | Kelly |
| 4,340,563 A | 7/1982 | Appel et al. |
| 4,381,326 A | 4/1983 | Kelly |
| 4,573,991 A | 3/1986 | Pieniak et al. |
| 4,661,389 A | 4/1987 | Mudge et al. |
| 4,753,838 A | 6/1988 | Kimura et al. |
| 4,842,596 A | 6/1989 | Kielpikowski et al. |
| 4,887,339 A | 12/1989 | Bellanger |
| 4,935,287 A | 6/1990 | Johnson et al. |
| 4,965,122 A | 10/1990 | Morman |
| 4,981,747 A | 1/1991 | Morman |
| 5,019,071 A | 5/1991 | Bany et al. |
| 5,028,646 A | 7/1991 | Miller et al. |
| 5,114,781 A | 5/1992 | Morman |
| 5,116,662 A | 5/1992 | Morman |
| 5,137,771 A | 8/1992 | Lofe et al. |
| 5,167,897 A | 12/1992 | Weber et al. |
| 5,226,992 A | 7/1993 | Morman |
| 5,300,057 A | 4/1994 | Miller et al. |
| 5,389,438 A | 2/1995 | Miller et al. |
| 5,459,202 A | 10/1995 | Martinez et al. |
| 5,462,708 A | 10/1995 | Swenson et al. |
| 5,501,679 A | 3/1996 | Krueger et al. |
| 5,531,729 A | 7/1996 | Coles et al. |
| 5,576,090 A | 11/1996 | Suzuki |
| 5,792,411 A | 8/1998 | Morris et al. |
| 5,885,686 A | 3/1999 | Cederblad et al. |
| 5,953,797 A | 9/1999 | Provost et al. |
| 5,983,467 A | 11/1999 | Duffy |
| 5,994,450 A | 11/1999 | Pearce |
| 6,054,091 A | 4/2000 | Miller et al. |
| 6,074,505 A | 6/2000 | Ouellette et al. |
| 6,090,234 A | 7/2000 | Barone et al. |
| 6,093,663 A | 7/2000 | Ouellette et al. |
| 6,190,592 B1 | 2/2001 | Gorman et al. |
| 6,190,594 B1 | 2/2001 | Gorman et al. |
| 6,261,278 B1 | 7/2001 | Chen et al. |
| 6,340,781 B1 | 1/2002 | Kling et al. |
| 6,406,466 B1 | 6/2002 | Pozniak et al. |
| 6,663,722 B1 | 12/2003 | Higashino et al. |
| 2002/0190418 A1 | 12/2002 | Jens et al. |
| 2003/0084996 A1 | 5/2003 | Alberg et al. |
| 2003/0085485 A1 | 5/2003 | Seidel et al. |
| 2003/0087059 A1 | 5/2003 | Jackson et al. |
| 2003/0087098 A1 | 5/2003 | Eaton et al. |
| 2004/0178544 A1 | 9/2004 | Jackson |

POLYMER TRANSFER APPARATUS, METHODS, AND COMPOSITE WEBS

FIELD OF THE INVENTION

The present invention relates to composite webs that include one or more polymeric structures on a substrate, as well as methods and systems for manufacturing the composite webs.

BACKGROUND

The manufacture of articles formed of webs that require some reinforcement to withstand forces experienced during use are known. In many cases, reinforcement is simply provided over the entire substrate or web. Such approaches can, however, add cost and weight to the web, as well as stiffness over the entire surface of the web—even in those areas that do not require reinforcement. Furthermore, reinforcing layers that are coextensive with the web may also reduce its breathability.

To address some of these issues, smaller pieces of reinforcing materials may be attached to a web or substrate in selected areas that require reinforcement. The handling and attachment of such discrete pieces can, however, be problematic, by potentially reducing throughput, causing waste (where the discrete pieces are not securely attached), requiring precise registration or location on the web, requiring the use of adhesives or other bonding agents, etc. The discrete pieces may also present relatively sharp edges that may be the source of irritation or discomfort. The irritation or discomfort can be exacerbated because the reinforcing pieces are typically located on the surface of the substrate.

In addition to (or in place of) reinforcing substrates or webs, it may also be desirable to manufacture articles that exhibit elasticity. The manufacture of articles that exhibit elasticity, i.e., the ability to at least partially recover their original shape after moderate elongation, may be desired for a number of reasons. For example, elasticity may be useful in connection with fastening systems for items such as garments (e.g., diapers, training pants, gowns, bedding, etc.). Elasticity in garments can provide what may be referred to as dynamic fit, i.e., the ability to stretch and recover in response to movement by the wearer.

Elasticity may also be useful in connection with other applications. For example, some fasteners may provide more consistent attachment if the fastener is held in tension that can be supplied by stretching the fastener and relying on the recovery forces to provide the desired tension. In other instances, elasticity may allow for easy adjustment of the size or length of a fastener or other article.

Although elasticity may be beneficial in a variety of different applications, it may raise issues in manufacturing. Many attempts to provide elasticity rely on separate elastic components that are, e.g., glued or sewn to a backing or other nonelastic member to provide the desired elasticity. The manufacture of such composite articles may be problematic in that secure attachment of the elastic components may be difficult to achieve and/or maintain. Further, the cost and difficulty of providing and attaching separate elastic components may be relatively high. The handling and attachment of separate elastic components can reduce throughput, cause additional waste (where the separate components are not securely attached), etc.

In other instances, an entire article may be constructed to provide the desired elasticity. For example, many elastic fastening systems rely on the use of elastic laminate backings in which the elastic materials are provided in the form of a film that is coextensive with the backing. Such an approach may add costs associated with providing a coextensive elastic layer or layers. Further, many elastic materials are not breathable. If the elastic laminate backings are to be used in garments, it may be desirable to perforate the backing to improve its breathability. Such additional processing does, however, add to the cost of producing the elastic laminate backing. Another potential disadvantage of elastic laminate backings is that it may be difficult to provide any adjustment of the elastic recovery forces generated in different portions of the backing.

While a variety of approaches to providing discrete polymeric structures on substrates are disclosed in, e.g., U.S. patent application Ser. No. 10/012,894 filed 5 Nov. 2001 and titled SYSTEMS AND METHODS FOR COMPOSITE WEBS WITH STRUCTURED DISCRETE POLYMERIC REGIONS; U.S. patent application Ser. No. 10/012,698 filed 5 Nov. 2001 and titled COMPOSITE WEBS WITH REINFORCING POLYMERIC REGIONS AND ELASTIC POLYMERIC REGIONS; U.S. patent application Ser. No. 10/012,900 filed 5 Nov. 2001 and titled METHODS FOR PRODUCING COMPOSITE WEBS WITH REINFORCING DISCRETE POLYMERIC REGIONS; and U.S. patent application Ser. No. 10/013,304, filed 5 Nov. 2001 and titled COMPOSITE WEBS WITH DISCRETE ELASTIC POLYMERIC REGIONS, these approaches may be limited in certain aspects, such as in roll temperatures, the composition of substrates, etc.

SUMMARY OF THE INVENTION

The present invention provides composite webs having one or more polymeric structures located on a substrate, methods of manufacturing the composite webs, and systems for manufacturing the composite webs.

The polymeric structures are formed using thermoplastic compositions. As used in connection with the present invention, "thermoplastic" (and variations thereof) means a polymer or polymeric composition that softens when exposed to heat and returns to its original condition or near its original condition when cooled to room temperature. The thermoplastic compositions used in connection with the methods of the present invention should be capable of flowing or entering into depressions in a forming tool as described herein.

Suitable thermoplastic compositions are those that are melt processable. Such polymers are those that will flow sufficiently to at least partially fill the depressions, yet not significantly degrade during a melt process. A wide variety of thermoplastic compositions have suitable melt and flow characteristics for use in the process of the present invention depending on the geometry of the depressions and the processing conditions. It may further be preferred that the melt processable materials and conditions of processing are selected such that any viscoelastic recovery properties of the thermoplastic compositions do not cause them to significantly withdraw from the depressions during wiping of the molten thermoplastic composition as described herein.

In the methods and systems, the forming tool used to form and transfer the one or more polymeric structures to the substrate is maintained at a roll temperature that is below the melt processing temperature of the thermoplastic composition. The melt processing temperature of the thermoplastic compositions of the present invention is the lowest temperature at which the thermoplastic composition is capable of flowing or entering into depressions in a forming tool (as described herein) within a period of five seconds or less.

In some instances, the melt processing temperature may be at or slightly above the glass transition temperature for an amorphous thermoplastic composition or at or slightly above the melting temperature for a crystalline or semicrystalline thermoplastic composition. If the thermoplastic composition includes one or more amorphous polymers blended with either or both of one or more crystalline and one or more semicrystalline polymers, then the melt processing temperature is the higher of the highest glass transition temperature of the amorphous polymers or the highest melting temperature of the crystalline and semicrystalline polymers. In addition, it may be preferred that the roll temperature be at least 20° Celsius or more below the temperature of the molten thermoplastic composition deposited on the forming tool.

One potential advantage of maintaining a relatively cool forming tool is that the molten thermoplastic composition applied to the forming tool (either on its cylindrical outer surface or within depressions formed therein) is that the molten thermoplastic composition in direct contact with the exterior roll surface falls below the melt processing temperature of the thermoplastic composition such that it may at least partially freeze or solidify, while at least a portion of the molten thermoplastic composition located distal from the exterior roll surface remains molten long enough to effect transfer of the thermoplastic composition to form the polymeric structures. The result is that the molten thermoplastic composition distal from the exterior roll surface is capable of attaching to a substrate, while the frozen or solidified thermoplastic composition in contact with the exterior roll surface releases from that surface cleanly.

Another potential advantage of maintaining a relatively cool forming tool is that the composition of the substrates to which the molten thermoplastic composition is transferred is not limited by the forming tool temperature. For example, the roll temperature may be low enough to limit any significant damage the substrate during the transfer process. As such, the polymeric structures may be formed on porous and non-porous substrates (such as films) that have the same or similar thermoplastic composition as the polymeric structures. In some instances involving substrates formed of thermoplastic compositions themselves, the substrate thermoplastic composition may preferably have a melt processing temperature that is at or below the melt processing temperature of the thermoplastic composition used in the polymeric structures formed thereon. The melt processing temperature of the substrate thermoplastic compositions is subject to the same definition provided above in connection with the thermoplastic compositions used to form the polymeric structures. In addition, it may be preferred that the roll temperature be at least 20° Celsius or more below the melt processing temperature of the substrate thermoplastic composition.

Concerns regarding the internal cohesive strength of the substrate and/or the tensile strength of the substrate may be of more concern if the substrate includes a fibrous construction (e.g., woven, nonwoven, or knit fibers) that could be separated from the remainder of the substrate by the forces exerted when the substrate is pulled away from the forming tool. These considerations may be limited by the present invention because of the freezing or solidification of the thermoplastic composition in the depressions. That freezing or solidification can limit any forces exerted on the substrate as the substrate and the polymeric structures are removed from the forming tool.

Another potential advantage of the methods of the present invention is the ability to transfer one or more polymeric structures onto a major surface of a substrate while a portion of the thermoplastic composition facing the substrate is molten. If the substrate is porous, fibrous, etc., pressure may enhance attachment of the one or more polymeric structures to the substrate by forcing a portion of the thermoplastic composition to infiltrate the substrate and/or encapsulate fibers of the substrate. If the substrate is not porous, but is made with a thermoplastic composition that has a melt processing temperature sufficiently low relative to the temperature of the molten thermoplastic composition in the depressions, then attachment of the polymeric structures may be achieved by intermixing of the thermoplastic compositions in the polymeric structures and the substrate.

Another potential advantage of the present invention is the opportunity to provide polymer structures that include surface features formed on their upper surfaces (i.e., the surfaces facing away from the substrate). The surface features may be, e.g., stems, hooks, pyramids, channels, indicia (alphanumeric or otherwise), etc. and may provide additional functionality such as, e.g., mechanical fastening, etc. These surface features may be provided in an integral process step at the same time as formation and transfer of the polymer structures themselves (as opposed to a separate, subsequent process step). Alternatively, though, the surface features could be provided after formation of the polymer structures.

Another potential advantage is the ability to control the shape, spacing, and volume of the one or more polymeric structures. In some instances, it may be preferred that a plurality of polymeric structures be provided on the first major surface of the substrate, with each of the polymeric structures being discrete polymeric structures (i.e., not connected to each other by the thermoplastic composition transferred to the substrate).

Another potential advantage of the present invention may be found in the ability to provide a thin base film between thicker thermoplastic composition structures. The thicker thermoplastic composition structures are attached to the substrate, but the base film may or may not be attached to the substrate. The base film may be, e.g., attached to the substrate by adhesives.

Another potential advantage of the methods of the present invention is the ability to provide one or more polymeric structures that extend for the length of the substrate (while preferably not being formed over the width of the substrate, i.e., the polymeric structures are not coextensive with the major surface of the substrate).

Another potential advantage of the methods of the present invention is the ability to provide different thermoplastic compositions in different areas across the width of the substrate, such that some polymeric structures may be formed of one thermoplastic composition, while other polymeric structures are formed of a different thermoplastic composition.

Yet another potential advantage of the methods of the present invention is the ability to provide one or more polymeric structures on both major surfaces of a substrate. The polymeric structures on the opposing major surfaces may be formed with the same or different structures as desired.

In one aspect, the present invention provides a method of producing a composite web by providing a forming tool having an exterior surface that includes one or more depressions formed therein; delivering a molten thermoplastic composition onto the exterior surface of the forming tool;

maintaining the exterior surface of the forming tool at a roll temperature that is below a melt processing temperature of the thermoplastic composition; wiping the molten thermoplastic composition on the exterior surface of the forming tool, wherein at least some of the molten thermoplastic composition enters the one or more depressions; transferring the thermoplastic composition in the one or more depressions to a substrate by contacting a first major surface of the substrate to the thermoplastic composition in the one or more depressions; and separating the substrate and the thermoplastic composition in the one or more depressions from the forming tool after the transferring, wherein a composite web is formed with one or more polymeric structures of the thermoplastic composition located on the first major surface of the substrate.

In another aspect, the present invention provides a method for producing a composite web by providing a forming tool having an exterior surface with one or more depressions formed therein; delivering a molten thermoplastic composition onto the exterior surface of the forming tool; maintaining the exterior surface of the forming tool at a roll temperature that is below the melt processing temperature of the thermoplastic composition; wiping the molten thermoplastic composition on the exterior surface of the forming tool, wherein some of the molten thermoplastic composition enters the one or more depressions and some of the molten thermoplastic composition forms a base film on the exterior surface of the forming tool; transferring the base film and the thermoplastic composition in the one or more depressions to a substrate by contacting a first major surface of the substrate to the base film and the thermoplastic composition in the one or more depressions while the base film and the thermoplastic composition in the one or more depressions are on the forming tool; and separating the base film and the thermoplastic composition in the one or more depressions from the forming tool after the transferring; wherein a composite web is formed with one or more polymeric structures of the thermoplastic composition located on the first major surface of the substrate and the base film extending between the one or more polymeric structures, wherein the base film has a maximum thickness that is less than a maximum thickness of the one or more polymeric structures.

In another aspect, the present invention provides a method for producing a composite web by providing a forming tool with an exterior surface that includes one or more depressions formed therein; delivering a molten thermoplastic composition onto the exterior surface of the forming tool; maintaining the exterior surface of the forming tool at a roll temperature that is below a melt processing temperature of the thermoplastic composition; wiping the molten thermoplastic composition on the exterior surface of the forming tool, wherein at least some of the molten thermoplastic composition enters the one or more depressions; transferring the thermoplastic composition in the one or more depressions to a substrate by contacting a first major surface of the substrate to the molten thermoplastic composition in the one or more depressions; and separating the substrate and the thermoplastic composition in the one or more depressions from the forming tool after the transferring, wherein a composite web is formed with one or more polymeric structures of the thermoplastic composition located on the first major surface of the substrate, wherein the thermoplastic composition includes one or more elastomeric polymeric components such that the one or more polymeric structures on the substrate exhibit elastic behavior. The method further includes stretching the composite web and the one or more polymeric structures located thereon such that the substrate exhibits permanent elongation after the stretching and such that a portion of the one or more polymeric structures detaches from the first major surface of the substrate.

In another aspect, the present invention provides a composite web including a substrate having a porous first major surface, the composite web further including one or more polymeric structures of a thermoplastic composition attached to the first major surface of the substrate. Each polymeric structure of the one or more polymeric structures occupies an area of the first major surface of the substrate and the area occupied by at least one polymeric structure of the one or more polymeric structures includes a bonded area in which the thermoplastic composition of the polymeric structure infiltrates the porous first major surface and a detached area in which the polymeric structure is not attached to the first major surface of the substrate.

These and other features and advantages of the present invention are described below in connection with various illustrative embodiments of the invention.

DETAILED DESCRIPTION OF ILLUSTRATIVE EMBODIMENTS OF THE INVENTION

As discussed above, the present invention provides methods and systems for producing composite webs that include polymeric structures located on the surface of a substrate. Various different constructions will now be described to illustrate various embodiments of the composite webs that can be manufactured in accordance with the methods of the present invention. These illustrative constructions should not be considered to limit the methods of the present invention, which is to be limited only by the claims that follow.

Figure 1:
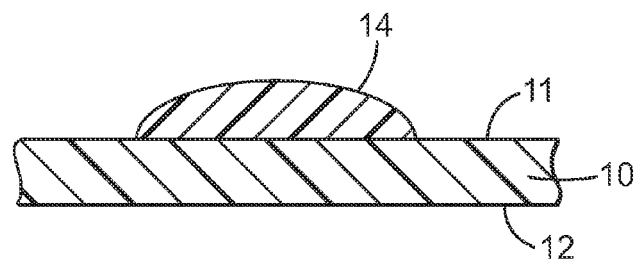
FIG. 1 is a cross-sectional view of one polymeric structure on a composite web manufactured according to the methods of the present invention.

FIG. 1 is a cross-sectional view of a portion of one composite web manufactured in accordance with the present invention. The composite web includes a substrate 10 with a first major surface 11 and a second major surface 12. One or more polymeric structures 14 are located on the first major surface 11 of the substrate 10, it being understood that the substrate may include more than one polymeric structure.

The polymeric structures 14 may cover any desired portion of the surface 11 of the substrate 10 on which they are positioned, although it will be understood that the polymeric structures 14 will not cover all of the surface of the substrate 10. For example, it may be preferred that the polymeric structures occupy less than all of the first major surface of the substrate, preferably less than 75% of the first major surface of the substrate, and optionally less than 50% of the first major surface of the substrate. At the lower end of the range, it may be preferred that the polymeric structures occupy at least 2% of the first major surface of the substrate, preferably 5% or more of the first major surface of the substrate, and optionally 10% or more of the first major surface of the substrate. Additional variations in the percentage of surface area occupied by polymeric structures may be as described in, for example, pending U.S. patent application Ser. No. 09/257,447, entitled WEB HAVING DISCRETE STEM REGIONS, filed on Feb. 25, 1999 (published as International Publication No. WO 00/50229).

Figure 2:
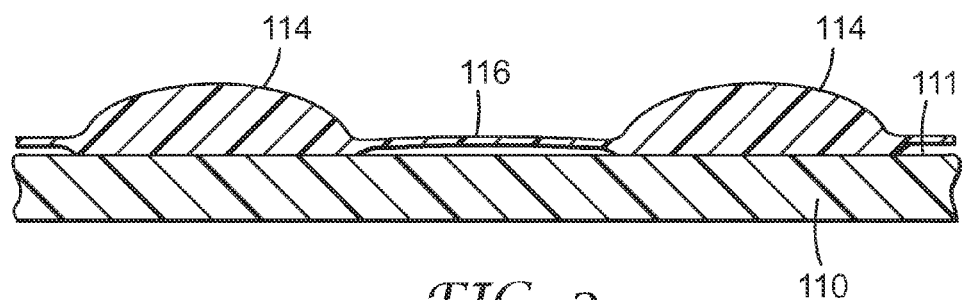
FIG. 2 is a cross-sectional view of polymeric structures and a base film on a composite web, with the base film being unattached to the substrate between the polymeric structures.

FIG. 2 depicts an alternative composite web construction in which polymer structures 114 are attached to the major surface 111 of a substrate 110. The polymeric structures 114 are, however, connected to each other by a thin base film 116. The base film 116 will typically be produced while forming and transferring to polymeric structures 114 to the substrate 110. Furthermore, the base film 116 will typically be manufactured of the same thermoplastic composition as the polymeric structures 114. Some exemplary processes of manufacturing polymeric structures with base films are described more completely below.

The base film 116 may be removed from the composite web after attachment of the polymeric structures 114 or it may be left in place. As seen in FIG. 2, the base film 116 may not be attached directly to the surface 111 of the substrate 110 over its entire surface. In such an arrangement, the base film 116 may be retained as a part of the composite web by attachment to the substrate 110 near the edges of the polymeric structures 114 and/or by attachment of the base film 116 to the polymeric structures 114 themselves.

The polymeric structures 114 and the base film 116 can be distinguished from each other in the composite web construction by their relative thickness. The polymeric structures 114 will have a maximum thickness (measured normal to the localized surface 111 of the substrate 110) that is greater than the maximum thickness of the base film 116. For example, the base film 116 may preferably have a maximum thickness that is 25% or less (more preferably 10% or less) of the maximum thickness of the polymeric structures 114 formed by depressions on the forming tool.

Figure 3:
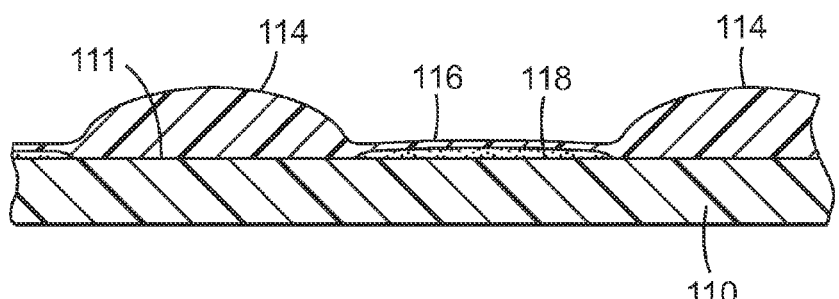
FIG. 3 is a cross-sectional view of polymeric structures and a base film on a composite web, with the base film attached to the substrate between the polymeric structures.

FIG. 3 depicts a composite web in which the base film 116 between the polymeric structures 114 is attached to the surface 111 of the substrate 110. In some instances, the base film 116 may be attached to the substrate 110 at the same time the polymeric structures 114 are attached thereto using the same mechanism used to attach the polymeric structures 114 (e.g., infiltration of the substrate 110 by the thermoplastic composition in the base film 116, intermixing of the thermoplastic composition of the base film 116 with the a substrate thermoplastic composition, etc.).

In other instances, the base film 116 may be attached to the substrate 110 after the polymeric structures 114 are attached thereto. For example, the base film 116 may be attached to the substrate 110 by, e.g., heat welding, chemical welding, heat sealing, cold pressure welding, lasers, ultrasonic energy, etc.

In the depicted embodiment, however, the base film 116 is attached to the surface 111 of the substrate 110 by adhesive 118 interposed between the base film 116 and the surface 111. The adhesive 118 may be any suitable composition, e.g., curable, pressure sensitive, heat activated, hot melt, etc. In addition, the adhesive 118 may be provided on the surface 111 of the substrate 110 before contacting the substrate with the base film 116 and polymeric structures 114, or it may provided on the base film 116 before contacting the base film 116 with the substrate 110.

Although adhesive 118 is not depicted as being located between the polymeric structures 114 and the substrate 110, it may be provided in those locations. The conditions (e.g., heat, pressure, etc.) encountered during attachment of the polymeric structures 114 to the substrate 110 may, however, result in degradation, etc. of the adhesive such that the adhesive 118 does not function as the primary mechanism of attachment to the substrate 110.

The polymeric structures on composite webs of the present invention may be uniformly spaced over the surface of the substrate in a regular, repeating pattern (in both the x and y directions) or the spacing and arrangement of polymeric structures may be non-uniform if so desired. Furthermore, the pattern in which the polymeric structures are arranged, may be irregular.

In other variations, portions of the composite webs manufactured in accordance with the present invention may include uniformly-spaced polymeric structures, while other portions of the same composite web may be free of any polymeric structures. In yet another alternative, portions of a composite web manufactured in accordance with the present invention may include uniformly spaced polymeric structures, while other portions of the same composite web may include polymeric structures that are arranged in non-uniformly spaced patterns. Further, different portions of a composite web manufactured according to the present invention may include different sets of polymeric structures that are both uniformly spaced in repeating patterns that are different from each other.

The polymeric structures could be provided in any desired shape, e.g., squares, rectangles, hexagons, etc. The shapes may or may not be in the form of recognized geometric shapes, but may be randomly formed with irregular perimeters. In addition, the shapes may not necessarily be solid figures, but may include islands formed within the shape in which none of the thermoplastic composition is transferred or a base film is transferred. In yet another alternative, some or all of the polymeric structures may be in the form of indicia, i.e., letters, numbers, or other graphic symbols.

The substrates used in connection with the composite webs of the present invention may have a variety of constructions. For example, the substrates may be a woven material, nonwoven material, knit material, netting, scrim, foam, paper, film, or any other continuous media that can be fed through a nip point. The substrates may have a wide variety of properties, such as extensibility, elasticity, flexibility, conformability, breathability, porosity, stiffness, etc. Further, the substrates may include pleats, corrugations, microcreping, or other deformations from a flat planar sheet configuration.

Unlike processes in which the substrates are contacted by rolls that are heated to temperatures that may result in softening or melting of the substrates such that the substrates lose their mechanical stability, the methods and systems of the present invention use rolls that are preferably maintained at temperatures that are below the temperatures that may result in softening or melting such that the substrates lose their mechanical stability. One potential advantage is that the substrates may be manufactured of the same or similar thermoplastic compositions as those found in the polymeric structures and base films. For example, it may be possible to apply polymeric structures of a polyolefin thermoplastic composition to a substrate that includes the same or similar thermoplastic composition (e.g., polypropylene polymeric structures on a polypropylene substrate).

In some instances, the substrates may exhibit some level of extensibility and also, in some instances, elasticity. Extensible webs that may be preferred may have an initial yield tensile force of at least about 50 gm/cm, preferably at least about 100 gm/cm. Further, the extensible webs may preferably be extensible nonwoven webs.

Suitable processes for making a nonwoven web that may be used in connection with the present invention include, but are not limited to, airlaying, spunbond, spunlace, bonded melt blown webs and bonded carded web formation processes. Spunbond nonwoven webs are made by extruding a molten thermoplastic, as filaments from a series of fine die orifices in a spinneret. The diameter of the extruded filaments is rapidly reduced under tension by, for example, by non-eductive or eductive fluid-drawing or other known spunbond mechanisms, such as described in U.S. Pat. Nos. 4,340,563 (Appel et al.); U.S. Pat. No. 3,692,618 (Dorschner et al.); U.S. Pat. Nos. 3,338,992 and 3,341,394 (Kinney); U.S. Pat. No. 3,276,944 (Levy); U.S. Pat. No. 3,502,538 (Peterson); U.S. Pat. No. 3,502,763 (Hartman) and U.S. Pat. No. 3,542,615 (Dobo et al.). The spunbond web is preferably bonded (point or continuous bonding).

The nonwoven web layer may also be made from bonded carded webs. Carded webs are made from separated staple fibers, which fibers are sent through a combing or carding unit which separates and aligns the staple fibers in the machine direction so as to form a generally machine direction-oriented fibrous nonwoven web. However, randomizers can be used to reduce this machine direction orientation.

Once the carded web has been formed, it is then bonded by one or more of several bonding methods to give it suitable tensile properties. One bonding method is powder bonding wherein a powdered adhesive is distributed through the web and then activated, usually by heating the web and adhesive with hot air. Another bonding method is pattern bonding wherein heated calender rolls or ultrasonic bonding equipment are used to bond the fibers together, usually in a localized bond pattern though the web can be bonded across its entire surface if so desired. Generally, the more the fibers of a web are bonded together, the greater the nonwoven web tensile properties.

Airlaying is another process by which fibrous nonwoven webs useful in the present invention can be made. In the airlaying process, bundles of small fibers usually having lengths ranging between 6 to 19 millimeters are separated and entrained in an air supply and then deposited onto a forming screen, often with the assistance of a vacuum supply. The randomly deposited fibers are then bonded to one another using, for example, hot air or a spray adhesive.

Meltblown nonwoven webs may be formed by extrusion of thermoplastic polymers from multiple die orifices, which polymer melt streams are immediately attenuated by hot high velocity air or steam along two faces of the die immediately at the location where the polymer exits from the die orifices. The resulting fibers are entangled into a coherent web in the resulting turbulent airstream prior to collection on a collecting surface. Generally, to provide sufficient integrity and strength for the present invention, meltblown webs must be further bonded such as by through air bonding, heat or ultrasonic bonding as described above.

A web can be made extensible by skip slitting as is disclosed in, e.g., International Publication No. WO 96/10481 (Abuto et al.). If an elastic, extensible web is desired, the slits are discontinuous and are generally cut on the web prior to the web being attached to any elastic component. Although more difficult, it is also possible to create slits in the nonelastic web layer after the nonelastic web is laminated to the elastic web. At least a portion of the slits in the nonelastic web should be generally perpendicular (or have a substantial perpendicular vector) to the intended direction of extensibility or elasticity (the at least first direction) of the elastic web layer. By generally perpendicular it is meant that the angle between the longitudinal axis of the chosen slit or slits and the direction of extensibility is between 60 and 120 degrees. A sufficient number of the described slits are generally perpendicular such that the overall laminate is elastic. The provision of slits in two directions is advantageous when the elastic laminate is intended to be elastic in at least two different directions.

A nonwoven web used in connection with the present invention can also be a necked or reversibly necked nonwoven web as described in U.S. Pat. Nos. 4,965,122; 4,981,747; 5,114,781; 5,116,662; and 5,226,992 (all to Morman). In these embodiments the nonwoven web is elongated in a direction perpendicular to the desired direction of extensibility. When the nonwoven web is set in this elongated condition, it will have stretch and recovery properties in the direction of extensibility.

The substrates used in connection with the present invention may preferably exhibit some porosity on one or both of the major surfaces of the substrate such that when a molten thermoplastic composition is provided on one of the major surfaces of the substrate, a mechanical bond is formed between the molten thermoplastic composition and the substrate as the molten thermoplastic composition infiltrates and/or encapsulates a portion of the porous surface of the substrate. As used in connection with the present invention, the term "porous" includes both structures that include voids formed therein, as well as structures formed of a collection of fibers (e.g., woven, nonwoven, knit, etc.) that allow for the infiltration of molten thermoplastic composition into the interstices between fibers. If the porous surface includes fibers, the thermoplastic composition may preferably encapsulate fibers or portions of fibers on the surface of the substrate.

If the substrate is not porous, but is made with a thermoplastic composition that has a melt processing temperature sufficiently low relative to the temperature of the molten thermoplastic composition in the depressions, then attachment of the polymeric structures may be achieved by intermixing of the thermoplastic compositions in the polymeric structures and the substrate. To attach polymeric structures in accordance with the present invention on substrates formed of thermoplastic compositions themselves, the substrate thermoplastic composition may preferably have a melt processing temperature that is at or below the melt processing temperature of the thermoplastic composition used in the polymeric structures formed thereon.

The type and construction of the material or materials in the substrate should be considered when selecting an appropriate substrate to which a molten thermoplastic composition is applied. For example, the substrate should have sufficient internal strength such that it does not fall apart during the process. Preferably, the substrate has sufficient strength in the machine direction at the temperature of the forming tool to remove it intact from the forming tool.

As used herein, the term "fiber" includes fibers of indefinite length (e.g., filaments) and fibers of discrete length, e.g., staple fibers. The fibers used in connection with the present invention may be multicomponent fibers. The term "multicomponent fiber" refers to a fiber having at least two distinct longitudinally coextensive structured polymer domains in the fiber cross-section, as opposed to blends where the domains tend to be dispersed, random, or unstructured. The distinct domains may thus be formed of polymers from different polymer classes (e.g., nylon and polypropylene) or be formed of polymers from the same polymer class (e.g., nylon) but which differ in their properties or characteristics. The term "multicomponent fiber" is thus intended to include, but is not limited to, concentric and eccentric sheath-core fiber structures, symmetric and asymmetric side-by-side fiber structures, island-in-sea fiber structures, pie wedge fiber structures, and hollow fibers of these configurations.

Although the substrates depicted in the various cross-sectional views of the articles manufactured according to the methods of the present invention are illustrated as single layer structures, it should be understood that the substrates may be of single or multi-layer construction. If a multi-layer construction is used, it will be understood that the various layers may have the same or different properties, constructions, etc. Some of these variations may be as described in, for example, pending U.S. patent application Ser. No. 09/257,447, entitled WEB HAVING DISCRETE STEM REGIONS, filed on Feb. 25, 1999 (published as International Publication No. WO 00/50229).

The polymeric structures of the present invention may be formed of a wide variety of different thermoplastic polymeric materials. Some examples of thermoplastic compositions that may be used in connection with the present invention include, but are not limited to, polyurethanes, polyolefins (e.g., polypropylenes, polyethylenes, etc.), polystyrenes, polycarbonates, polyesters, polymethacrylates, ethylene vinyl acetate copolymers, ethylene vinyl alcohol copolymers, polyvinylchlorides, acrylate modified ethylene vinyl acetate polymers, ethylene acrylic acid copolymers, nylons, fluorocarbons, etc. Suitable thermoplastic polymers will generally have a melt flow index of 5–200 grams/10 minutes measured at the appropriate conditions for the polymer as specified in ASTM D 1238. Furthermore, the thermoplastic composition may be, e.g., a thermoplastic hot melt adhesive.

The thermoplastic compositions of the present invention may include either or both of nonelastomeric or elastomeric thermoplastic polymers. A nonelastomeric thermoplastic polymer is one that is melt processable and that returns to its original condition or near its original condition upon cooling and which does not exhibit elastomeric properties at ambient conditions (e.g., room temperature and pressure). As used in connection with the present invention, "nonelastomeric" means that the material will not substantially resume its original shape after being stretched. Further, the nonelastomeric polymers may preferably sustain permanent set following deformation and relaxation, which set is preferably at least about 20 percent or more, and more preferably at least about 30 percent or more of the original length at moderate elongation, e.g., about 50% (for those materials that can even be stretched up to 50% without fracture or other failure).

An elastomeric (or elastic) thermoplastic polymer is one that melts and returns to its original condition or near its original condition upon cooling and exhibits elastomeric properties at ambient conditions (e.g., room temperature and pressure). As used in connection with the present invention, "elastomeric" means that the material will substantially resume its original shape after being stretched. Further, the elastomeric polymers may preferably sustain only small permanent set following deformation and relaxation which set is preferably no greater than about 30 percent and more preferably no greater than about 20 percent of the original length at moderate elongation, e.g., about 50%. The elastomeric thermoplastic compositions of the present invention can be both pure elastomers and blends with an elastomeric phase or content that will still exhibit substantial elastomeric properties at room temperature. U.S. Pat. No. 5,501,679 (Krueger et al.) provides some further discussion regarding elastomeric materials that may be considered for use in connection with the present invention.

The elastic thermoplastic compositions can include one or more polymers. For example, the polymer composition could be a blend with an elastomeric phase such that the polymer exhibits elastomeric properties at room temperature. Suitable elastic thermoplastic polymer compositions may include block copolymers such as conventional A-B or A-B-A block copolymers (e.g., styrene-isoprene-styrene, styrene-butadiene-styrene, styrene-ethylene-butylene-styrene block copolymers), elastomeric polyurethanes, olefinic elastomers, particularly elastomeric ethylene copolymers (e.g., ethylene vinyl acetates, ethylene/octene copolymer elastomers, ethylene/propylene/diene terpolymer elastomers), as well as mixtures of these with each other, with other elastic thermoplastic polymers, or with nonelastic thermoplastic polymers.

The thermoplastic compositions used in connection with the present invention can also be combined with various additives for desired effect. These include, for example, fillers, viscosity reducing agents, plasticizers, tackifiers, colorants (e.g., dyes or pigments), antioxidants, antistatic agents, bonding aids, antiblocking agents, slip agents, stabilizers (e.g., thermal and ultraviolet), foaming agents, microspheres, glass bubbles, reinforcing fibers (e.g., microfibers), internal release agents, thermally conductive particles, electrically conductive particles, and the like. The amounts of such materials that can be useful in the thermoplastic compositions can be readily determined by those skilled in the art of processing and using such materials.

Figure 4:
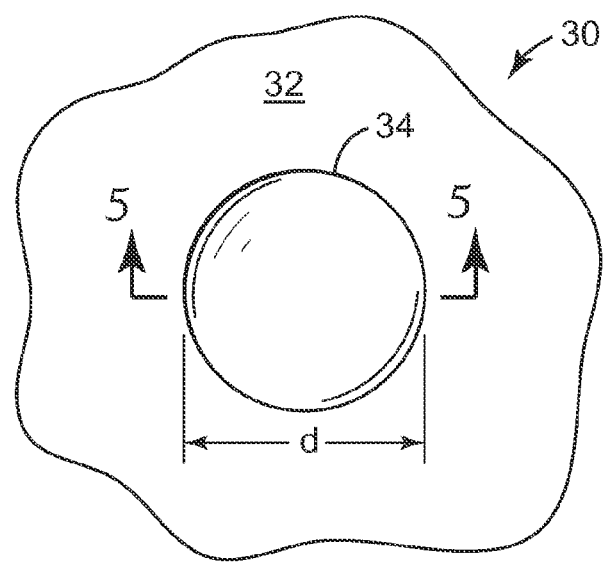
FIG. 4 is a plan view of a portion of a forming tool including a depression in its exterior surface that can be used in manufacturing composite webs according to the methods of the present invention.
Figure 5:
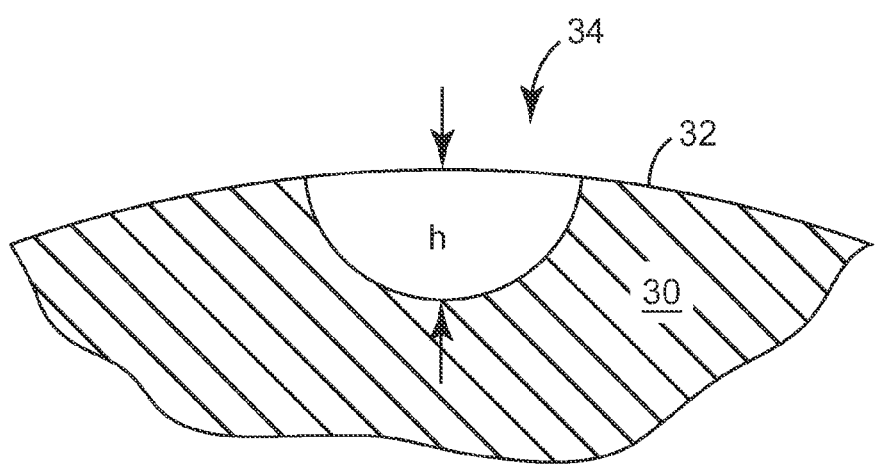
FIG. 5 is a cross-sectional view of the depression of FIG. 4 taken along line 5—5 in FIG. 4.

FIG. 4 is a plan view of one exemplary depression 34 in transfer roll 30 of the present invention, while FIG. 5 is a cross-sectional view of the depression 34 taken along line 5—5 in FIG. 4. The depression 34 has a circular footprint (i.e. shape of the opening into the depression 34 at the surface 32 of the roll) with a diameter represented by the letter d. The depression 34 has a depth (represented by the letter h) measured from the exterior surface 32 of the transfer roll 30.

Forming tools used in connection with the present invention preferably include depressions that are large enough to form polymeric structures on a substrate. The depressions and/or the polymeric structures formed according to the principles of the present invention may be characterized in a variety of manners. For example, the depressions 34 may be characterized in terms of the area occupied by their footprint on the exterior surface of the forming tool, a maximum dimension of the footprint (in any direction on the surface of the roll), the volume of the depression, the shape of the footprint, etc.

When characterized in terms of the area occupied by the footprint of the depressions, each of the depressions 34 may have a footprint with an area of about 4 square millimeters ($mm^2$) or more. In other situations, each of the depressions 34 may have footprints with an area of about 8 $mm^2$ or more.

Another manner in which the depressions may be characterized is in terms of the largest footprint dimension as measured on the surface 32 of the transfer roll 30. For a depression with a circular footprint as seen in FIGS. 4 and 5, the largest dimension is the same in all directions, but the depressions used in connection with the present invention may take any desired shape (e.g. elongated, irregular, etc.) in which the largest dimension will occur in one or more directions on the exterior surface of the transfer roll 30, but not in others. When characterized in terms of the largest footprint dimension, it may be that the depressions have a largest footprint dimension of about 2 millimeters (mm) or more, in some instances about 5 mm or more.

Where elongated strands are formed as a part of the polymeric structures (either by grooves in the forming tool or by strands of thermoplastic composition deposited on the exterior surface of the forming tool), it may be preferred that the strands have a width of 1 millimeter or more measured in a direction transverse to their length.

Yet another manner in which the depressions used in connection with the present invention may be characterized is in terms of volume. For example, the depressions may have a depression volume of at least about three (3) cubic millimeters ($mm^3$) or more, or alternatively, a depression volume of about five (5) cubic millimeters.

Figure 6:
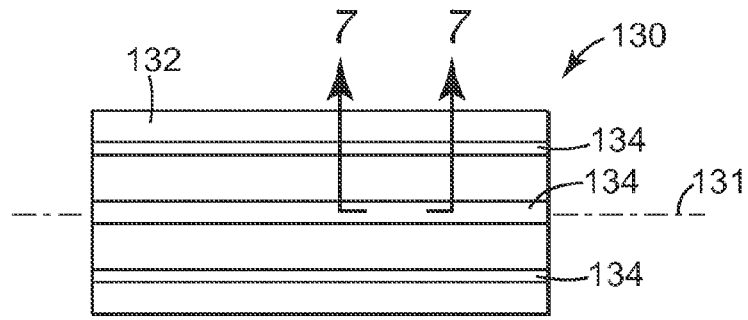
FIG. 6 is a plan view of alternative depressions on a forming tool that can be used to manufacture polymeric structures on a composite web according to the methods of the present invention.
Figure 7:
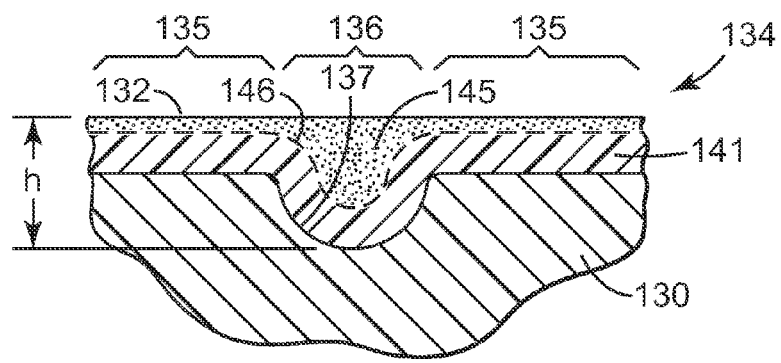
FIG. 7 is an enlarged cross-sectional view of a portion of one of the depression of FIG. 6, taken along line 7—7 in FIG. 6, wherein the depression contain thermoplastic composition.

FIGS. 6 and 7 depict another set of depressions on a forming tool 130 in which the depressions 134 are oriented substantially along the face of the roll 130 (i.e., generally aligned with axis 131). The roll 130 is designed to rotate about axis 131 in use and, as a result, the depressions 134 would typically deposit polymeric structures that are oriented in a cross-web direction (as opposed to a down web or machine direction). Although more than one depression 134 is depicted on the exterior surface 132 of the roll 130, it will be understood that the roll may include only one such depression formed in its exterior surface 132 if so desired.

The cross-sectional view of FIG. 7 (taken along line 7—7 in FIG. 6) depicts another optional feature of depressions in forming tools of the present invention. The depression 134 includes shallower areas 135 and deeper areas 136. The depth of the different areas is measured normal to the exterior surface 132 of the forming tool 130. For example, the deeper area 136 has a height h as seen in FIG. 7.

In FIG. 7, the depression 134 includes thermoplastic composition 141 located therein. The thermoplastic composition 141 within the depression 134 preferably exhibits two different properties that, in FIG. 7, are demarcated by broken line 146. The portion of the thermoplastic composition 141 proximate the surface 137 of the depression 134 (e.g., between the surface 137 and broken line 146) may preferably fall below the melt processing temperature of the thermoplastic composition 141 after it is deposited into the depression 134 but before the thermoplastic composition 141 in the depression 134 is contacted by a substrate (as discussed in more detail below). In some instances it may be possible to characterize the portion of the thermoplastic composition 141 that has fallen below the melt processing temperature as having frozen, solidified, formed a skin layer, etc.

In contrast, the portion of the thermoplastic composition 141 distal from the surfaces 137 of the depression 134 (e.g., on the opposite side of broken line 146) preferably remains at or above the melt processing temperature of the thermoplastic composition 141 at least until the thermoplastic composition 141 in the depression 134 is contacted by a substrate. Because the distal portion of the thermoplastic composition 141 remains at or above the melt processing temperature, it may be, e.g., characterized as molten. That distal portion of the thermoplastic composition 141 that remains at or above the melt processing temperature may be available to infiltrate a porous substrate or intermix with a polymeric substrate as described herein.

It should be understood that although broken line 146 demarcates a sharp boundary, the actual boundary between molten and solidified or frozen thermoplastic composition 141 may not be a sharp line, but, rather, a transition zone having a depth.

Another feature depicted in connection with FIG. 7 is the larger mass of thermoplastic composition 141 that fills the area 136 as compared to the smaller mass of molten thermoplastic composition that fills the shallower portions 135 of the depression 134 during processing. Those different amounts of thermoplastic composition in the different areas can provide a number of advantages.

One potential advantage is that the locally increased mass of thermoplastic composition 141 in area 136 may preferably include a larger mass of thermoplastic composition 141 that remains at or above the melt processing temperature as compared to the thermoplastic composition 141 in the shallower areas 135. The larger mass of thermoplastic composition 141 at or above the melt processing temperature within area 136 may be more effective at, e.g., infiltrating a porous substrate or intermixing with the same or different polymers in, e.g., a polymeric film substrate under the transfer conditions. Conversely, the smaller amount of thermoplastic composition 141 at or above the melt processing temperature in the shallower areas may be less effective at, e.g., infiltrating a porous substrate or intermixing with the same or different polymers in, e.g., a polymeric film substrate under the transfer conditions.

In some instances, all of the thermoplastic composition 141 in the shallower areas 135 may fall below the melt processing temperature before contacting a substrate such that the thermoplastic composition 141 in the shallower areas 135 will not infiltrate or intermix with the substrate. In those same instances, however, it is preferred that at least a portion of the thermoplastic composition 141 in the deeper areas 136 remain at or above the melt processing temperature to retain its ability to infiltrate and/or intermix with a substrate such that bonds are formed between the thermoplastic composition in the depression 134 and the substrate.

The different amounts of thermoplastic composition 141 remaining at or above the melt processing temperature in the different areas 135 and 136 may contribute to the formation of a polymeric structure can be described as exhibiting differential bonding characteristics. The areas of the resulting polymeric structure that bond to the substrate (typically those corresponding generally to the deeper areas 136 in which more or at least some of the thermoplastic composition 141 remains at or above the melt processing temperature) can be described as "bonded areas." The portions of the polymeric structure that correspond to the shallower area 135 of depression 134 (typically those areas in which none of or less of the thermoplastic composition 141 remains at or above the melt processing temperature) may typically form limited or no bond with the substrate and, as such, may be referred to herein as a "detached area" of the polymeric structure formed by depression 134.

The depressions 134 depicted in FIGS. 6 and 7 represent one manner in which a locally increased mass of molten thermoplastic composition may be delivered in a larger depression. The depression 234 of FIGS. 8 and 9 preferably has a constant depth from the exterior surface 232 of the forming tool 230 along its length (see, e.g., the cross-sectional view of FIG. 9). A locally increased mass of molten thermoplastic composition can, however, be delivered by area 236 in which the depression 234 widens as compared to the narrower surrounding areas 235 of depression 234. As a result, the widened area 236 delivers a locally increased mass of molten thermoplastic composition that provide the differential bonding characteristics discussed above with respect to depression 134 of FIGS. 6 and 7. It should also be understood that the two features depicted in FIGS. 6-8 may be combined, e.g., depressions may be provided with locally increased masses of thermoplastic composition that are contained in areas that are both deeper and wider than the surrounding depression.

Figure 8:
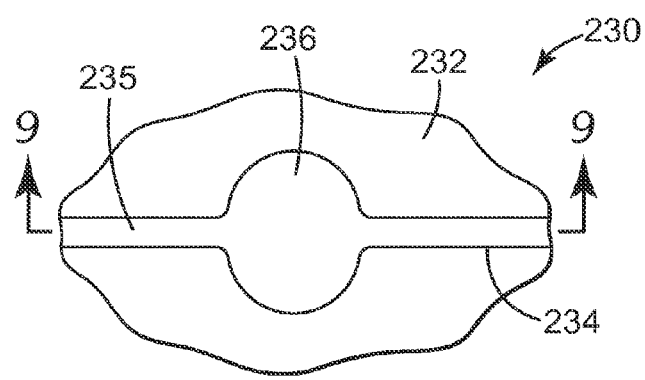
FIG. 8 is a plan view of a portion of another depression on a forming tool that can be used to manufacture polymeric structures on a composite web according to the methods of the present invention.
Figure 9:
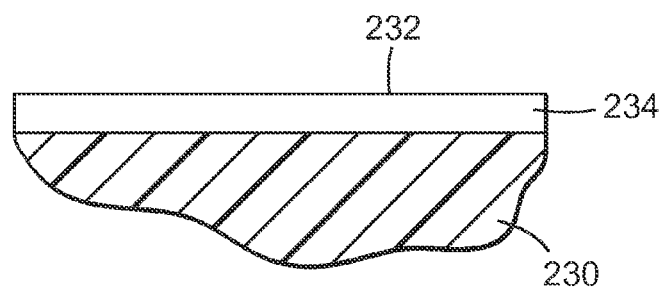
FIG. 9 is a cross-sectional view of the depression of FIG. 8, taken along line 9—9 in FIG. 8.

Depressions such as those depicted in FIGS. 6-8 may, in some instances, be characterized by volume differentials in one or more directions. For example, it may be preferred that, for elongated depressions, the areas of locally increased mass have a volume per unit length that is 125% or more (preferably 150% or more) of the volume per unit length of the surrounding depression.

Still another manner in which a locally increased mass of molten thermoplastic composition may be delivered to a substrate to achieve, e.g., differential bonding of a polymeric structure can be described with reference to FIGS. 23 & 24 below. In those processes, molten thermoplastic composition is applied over a mass of thermoplastic composition in a depression as, e.g., a strand of molten thermoplastic composition. Those areas in which the molten thermoplastic composition extends over molten thermoplastic composition in a depression may provide the locally increased mass of thermoplastic composition needed to form a differentially bonded polymer structure on a substrate.

FIGS. 10-13 depict still other variations in the depressions used to provide polymeric structures on substrates in connection with the methods of the present invention. The ring-shaped depression 334 is located in the surface 332 of a forming tool in the form of an elongated trough with an island 333 located in the ring formed by depression 334. Although the depicted ring-shaped depression 334 is an elongated oval-like shape, ring shaped depressions of the present invention may be formed in any desired shape, e.g., circular, square, triangular, etc.

Figure 10:
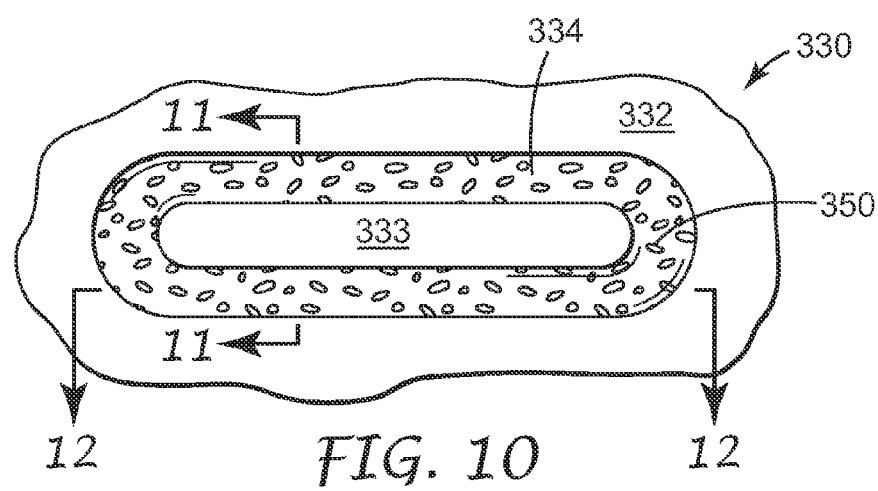
FIG. 10 is a plan view of one ring-shaped depression on a forming tool.

Depressions that include islands such as that depicted in FIG. 10 can be used to provide polymeric structures on a substrate in which a portion of the substrate is exposed within a surrounding polymer structure or in which a base film is provided within a surrounding polymer structure. The resulting construction may, for example, be used to reinforce the substrate in the area of, e.g., a buttonhole, slot, perforation, or other opening formed on in the substrate. Other uses for similar structures may also be envisioned.

The island 333 formed in the center of depression 334 may be the same height as the exterior surface 332 of the forming tool that surrounds the depression 334. Although the depression 334 is depicted with only a single island 333 formed therein, depressions used in connection with the methods of the present invention may include two or more islands located within each depression if so desired. Furthermore, the shape of the island and surrounding depression may also vary, e.g., a depression that has a circular outermost perimeter may be paired with an island having a different shape. In another variation, the island may not be centered within the depression as depicted in FIG. 10.

The orientation of the depression 334 on a forming tool 330 may be selected based on a variety of factors. The depression 334 may be aligned in the machine direction (i.e., the direction of travel of a substrate), in the cross-web direction (i.e., transverse to the direction of travel of the substrate), or any other orientation between machine direction or cross-web direction.

Figure 11:
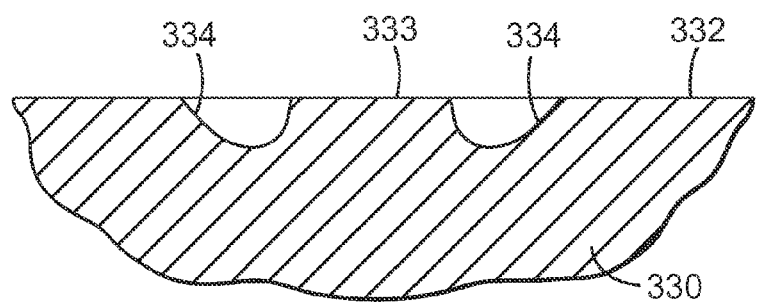
FIG. 11 is a cross-sectional view of the depression of FIG. 10, taken along line 11—11 in FIG. 10.

Another variation depicted in FIG. 11 is the variation in depth of the depression 334, with the depression being deepest proximate the island and rising to a shallower depth at the outermost perimeter of the depression 334. Such a construction may provide a polymeric structure with more flexible edges due to thinning of the polymeric structure.

Figure 12:
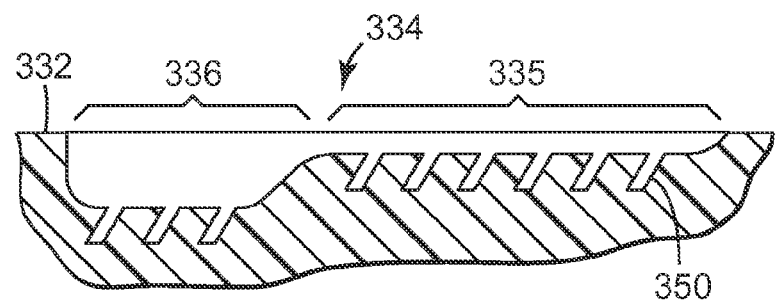
FIG. 12 is a cross-sectional view of the depression of FIG. 10 taken along line 12—12 in FIG. 10.

FIG. 12 depicts another optional variation in the depression of FIG. 10. As seen in the cross-sectional view of FIG. 12, the depth of the depression 334 from the exterior surface of the 332 of the forming tool 330 may vary with an area 335 being shallower than the deeper area 336. That deeper area 336 of depression 334 provides a locally increased mass of molten thermoplastic composition for transfer to a substrate.

Figure 13:
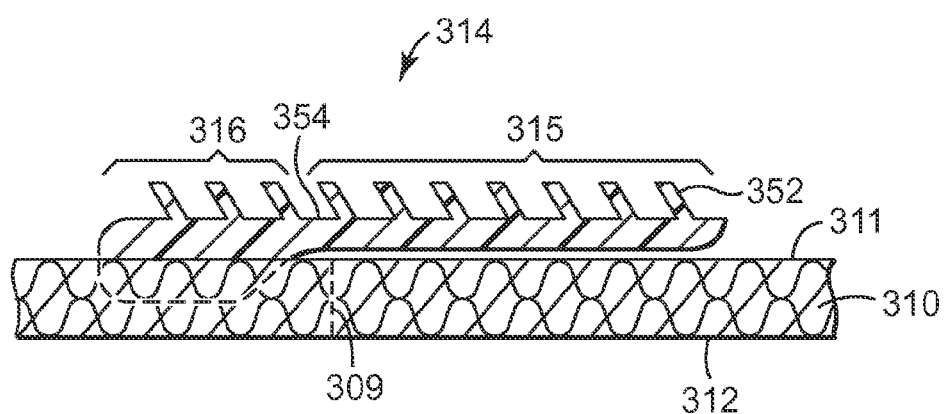
FIG. 13 is a cross-sectional view of a polymeric structure formed by the depression of FIG. 10 on a substrate.

One example of a polymeric structure 314 that can be formed on surface 311 of substrate 310 by the depression 334 is depicted in FIG. 13. The polymeric structure 314 occupies an area on the surface 311 of substrate 310. The area occupied by the polymeric structure 314 can be described as including a detached area 315 corresponding to the shallower area 335 of depression 334 and a bonded area 316 corresponding to the area 336 of depression 334. The substrate 310 may be porous on the surface 311. As a result, the increased mass of thermoplastic composition in the area 336 results in infiltration of the of the substrate 310 by the thermoplastic composition within the bonded area 316 of the polymeric structure 314 as depicted by the broken line within the body of the substrate 310. In comparison, the reduced mass of thermoplastic composition in the area 335 of depression 334 results in little or no infiltration of the substrate 310 by the thermoplastic composition in the detached area 315 of the polymeric structure 314. As a result, the polymeric structure 314 can be described as differentially bonded to the substrate 310.

In some instances the differential bonds can be characterized by penetration of the thermoplastic composition into a porous substrate. For example, the thermoplastic composition within the bonded area 316 may preferably infiltrate the porous substrate 310 to a depth of at least 50% of the thickness of the porous portion of the substrate 310 (which, in the case of the depicted substrate 310 is all of the thickness of the substrate). In contrast, the thermoplastic composition within the detached area 315 may preferably infiltrate the substrate 310 to a depth of 25% or less of the thickness of the porous portion of the substrate 310. In the depicted example, the thermoplastic composition in the detached area 315 does not infiltrate the substrate 310 at all.

If the surface 311 of the substrate 310 is not porous, but is, for example, a film manufactured of a thermoplastic composition, the differential bonding characteristic described above may also be achieved, with the bonded area 316 being attached by, e.g., intermixing of the molten thermoplastic composition of the polymeric structure 314 with the thermoplastic composition of the surface 311 of the substrate 310. The thermoplastic composition of the polymer structure 314 in the detached area 315 may exhibit little or no intermixing with the thermoplastic composition on the surface 311 of the substrate 310.

Another variation illustrated in connection with FIGS. 12 & 13 are the surface features 352 formed on the upper surface 354 of the polymeric structure 314 (where the upper surface 354 generally faces away from the substrate 310). The surface features 352 may include, for example, stems (capped or otherwise), hooks (as part of a hook and loop fastening system), pyramids, indicia (alphanumeric or otherwise), etc. Although the surface features 352 may be useful in mechanical fastening systems, the surface features provided on polymeric structures of the present invention may serve other functions including, but not limited to, grip enhancement, abrasion, polishing, etc. Furthermore, it should be understood that surface features may be provided on all or only some of the polymeric structures.

The surface features 352 of FIG. 13 are depicted as stems oriented at an acute angle with respect to the surface 354 of the polymeric structure 314. Although the stems are depicted as having substantially constant dimensions, they may be tapered, bent, capped, or otherwise formed to enhance their use as, e.g., mechanical fasteners. Furthermore, although the stems are depicted as angled in one direction, they may alternatively be angled in different directions and/or oriented normal to the surface 354.

The orientation of the stems depicted in FIG. 13 may be advantageous for a number of reasons. For example, the angled stems may not require a cap or other structure to engage a loop surface or other fibrous substrate adapted to engage the stems. The composite web depicted in FIG. 13 may exhibit the ability to fasten to a loop or other surface in a selected direction while releasing when the web is moved in the opposite direction. Such a construction may be particularly useful in connection with an elastic substrate.

The angled orientation of the stems depicted in FIG. 13 may be provided in a variety of manners. For example, the stems may be manufactured using a tool having holes or cavities that are angled or tilted in the desired direction or directions. Alternatively, the stems may be bent after formation.

The depression 334 seen in FIG. 12 includes cavities 350 in which the surface features 352 are formed by a thermoplastic composition filling the depression 334 (the cavities 350 are also depicted in the plan view of FIG. 10). The shape, size, spacing, depth and other characteristics of the cavities 350 may vary depending on factors such as the thermoplastic composition being used, the temperature of the thermoplastic composition delivered to the depression, etc.

The shape or profile of the cavities (and the resulting surface features 352 they form) may differ from those depicted in connection with FIGS. 12 & 13. For example, the cavities may be formed in more of a hook-shape, have tapered diameters, etc. Some example of alternatively shaped cavities and the structures that may be formed using them are depicted in, e.g., U.S. Pat. No. 5,792,411 (entitled LASER MACHINED REPLICATION TOOLING), U.S. Pat. No. 6,190,594 B1 (entitled TOOLING FOR ARTICLES WITH STRUCTURED SURFACES), U.S. Patent Application Publication No. US 2002/0190418 A1 (entitled CONTINUOUS MOLDING OF FASTENER PRODUCTS WITH A MOLD BELT), etc.

In another variation depicted in FIG. 13, the substrate 310 may terminate in the area occupied by the portion 315 of the polymeric structure 314. An example of this is depicted by broken line 309 in FIG. 13. The line 309 may denote the edge of the substrate 310 during the transfer process or the line 309 may denote a line along which the substrate 310 may be separated after the polymeric structure 314 is transferred to the surface 311.

In still another variation, the substrate 310 itself may include a loop structure on the surface opposite that on which the polymeric structures are located or within the areas on the same surface as the polymeric structures that are not occupied by the polymeric structures. As a result, the composite web may provide a unitary fastener having both stems, hooks, etc, and the complementary loop material needed for fastening.

Figure 14:
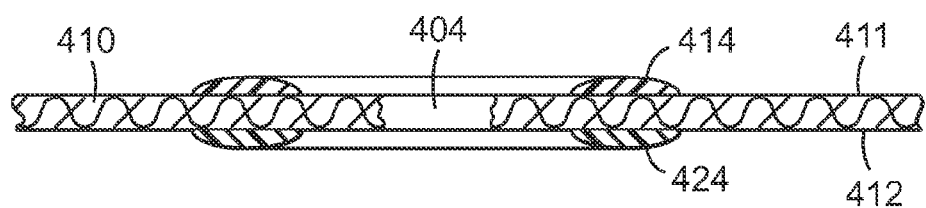
FIG. 14 is a cross-sectional view of a portion of a composite web with ring-shaped polymeric structures on both major sides of a substrate.

FIG. 14 depicts yet another embodiment of a composite web manufactured in accordance with the present invention. The composite web includes a substrate 410 with opposing major surfaces 411 and 412. One feature illustrated in FIG. 14 is the two-sided nature of the polymeric structures located on the opposing major surfaces 411 and 412, respectively. Polymeric structure 414 is provided on major surface 411 and polymeric structure 424 is provided on opposing major surface 412. Both polymeric structure 414 and polymeric structure 424 are exposed on opposite sides of the composite web.

The polymeric structures on opposing major surfaces are depicted as being in registration through the substrate 410. In other words, the polymeric structure 414 is aligned with the polymeric structure 424 on the opposite side of the substrate 410. Further, the polymeric structure 414 is depicted as being substantially the same size as the polymeric structure 424 located on the opposite side of the substrate 410. It should, however, be understood that when a composite web having polymeric structures on both major surfaces is desired, the polymeric structures on the opposing surfaces may or may not be the same size as seen in FIG. 14. Also, it should be understood that the polymeric structures may or may not be in registration with each other through the substrate 410 as seen in FIG. 14.

The polymeric structures 414 and 424 may be envisioned as forming a grommet structure on the substrate 410. As a result, it may be desired to provide an optional opening 404 through the substrate 410 as seen in FIG. 10. The opening may be formed by any suitable technique, e.g., mechanical perforation with a tool, laser ablation, water or gas-jet cutting, etc.

Although not depicted, other variations in composite webs manufactured according to the present invention may include two or more substrates laminated together with one or more polymeric structures located between the laminated substrates. Such laminated constructions may be useful, for example, to provide a cloth-like or softer feel or appearance, breathability, porosity, etc. on both sides of the composite web. This is in contrast to the composite webs in which the polymeric structures are located on an exposed surface of the composite web. A laminated composite web structure may also be used to provide different properties on opposite sides of the composite web structure. For example, the porosity or other properties may differ between the different substrates. Examples of such laminating processes may be described in, e.g., U.S. patent application Ser. No. 10/012,698 filed 5 Nov. 2001 and titled COMPOSITE WEBS WITH REINFORCING POLYMERIC REGIONS AND ELASTIC POLYMERIC REGIONS and U.S. patent application Ser. No. 10/012,900 filed 5 Nov. 2001 and titled METHODS FOR PRODUCING COMPOSITE WEBS WITH REINFORCING DISCRETE POLYMERIC REGIONS.

Figure 15:
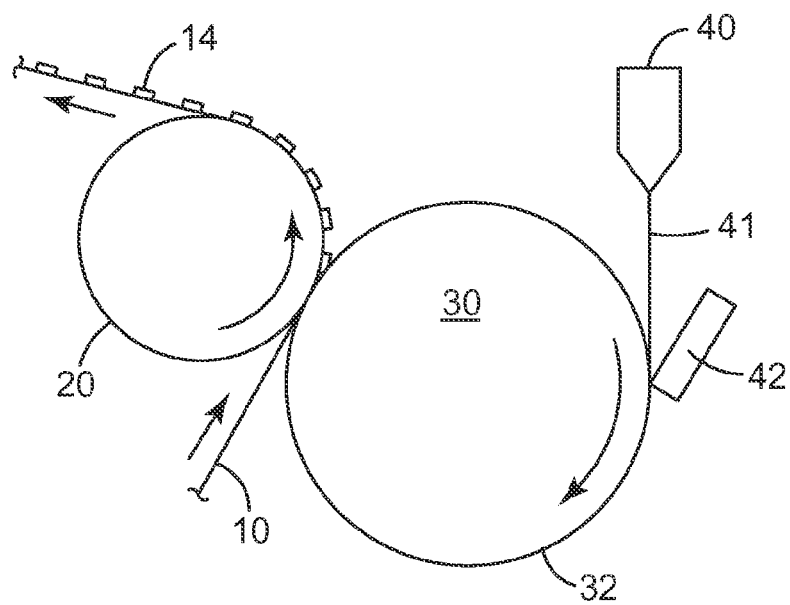
FIG. 15 is a diagram of one polymer transfer system that may be used to provide polymeric structures on a substrate in accordance with the methods of the present invention.

FIG. 15 depicts a web path and rolls in one system and method of providing polymeric structures 14 on one surface of a substrate 10 in accordance with the principles of the present invention. The system depicted in FIG. 15 includes a substrate 10 that defines a web path through the system. The substrate 10 moves through the system in a downstream direction indicated by the rotation arrows on the various rolls. After being unwound or otherwise provided from a supply (e.g., the substrate 10 may be manufactured in-line with the system depicted in FIG. 15), the substrate 10 is directed into a transfer nip formed between a backup roll 20 and a forming tool 30.

Although the composite web may preferably be formed using a forming tool in the form of a roll in the illustrated embodiments, it should be understood that the forming tools of the present invention may alternatively be provided in forms other than rolls, e.g., endless belts, etc. Furthermore, the forming tool (roll or otherwise) may be manufactured by any suitable technique, e.g., a machining, etching, helically-wound rolls (such as in, e.g., U.S. Pat. No. 6,190,594 B1 entitled TOOLING FOR ARTICLES WITH STRUCTURED SURFACES), stacked plate technology, etc.

The process of providing polymeric structures 14 on the substrate 10 includes delivering a supply of a molten thermoplastic composition to the exterior surface 32 of forming roll 30 that includes a one or more depressions formed in its exterior surface 32. The molten thermoplastic composition 41 is supplied to the exterior surface 32 of the forming roll 30 by a delivery apparatus in the form of a an extruder 40. The molten thermoplastic composition is wiped or removed from the exterior surface 32 by a doctor blade 42 acting against the exterior surface 32 of the forming roll 30. Although it may be desirable to remove all of the thermoplastic composition from the exterior surface 32 of the forming roll 30, some of the thermoplastic composition may remain on the exterior surface 32 after wiping by the doctor blade 42.

The doctor blade 42 is preferably heated to a temperature that is at least the melt processing temperature of the thermoplastic composition. It may be preferred that the doctor blade temperature be the same as the temperature of the molten thermoplastic composition 41 extruded by the extruder 40 or even higher.

The roll temperature of roll 30 is also preferably controlled in the systems of the present invention. As discussed above, it is preferred that the roll temperature be lower than the melt processing temperature of the thermoplastic composition being deposited on the roll 30. By controlling the roll temperature, various processing advantages may be obtained as discussed herein.

The extruder 40 in the depicted system preferably extrudes the molten thermoplastic composition 41 into the interface of the doctor blade 42 and the exterior surface 32 of the roll 30. In some instances, the molten thermoplastic composition 41 may flow down the doctor blade 42 to the interface between the blade 42 and the roll 30.

The depressions formed in the exterior surface 32 of the forming roll 30 preferably receive a portion of the molten thermoplastic composition when the molten thermoplastic composition is deposited on the exterior surface 32 of the forming roll 30. Filling of the depressions by the molten thermoplastic composition may be enhanced by the wiping action of the doctor blade 42 on the exterior surface 32 of the forming roll 30. The flow rate of the molten thermoplastic composition 41 from the extruder may be controlled such that the volume of the molten thermoplastic composition may preferably be equivalent to the volume of the depressions passing the doctor blade. That relationship may be advantageous because it may prevent or reduce the accumulation of thermoplastic composition behind the doctor blade 42. Accumulation of the thermoplastic composition behind the doctor blade 42 may be detrimental because of the lower roll temperature, which can cause the viscosity of the thermoplastic composition to increase such that the depressions cannot be filled properly.

Figure 16:
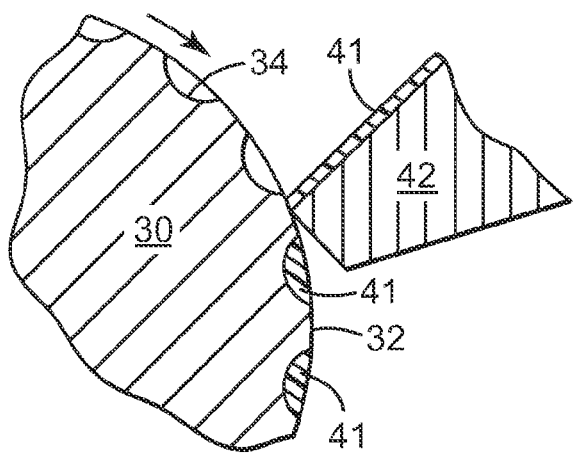
FIG. 16 is an enlarged schematic diagram depicting one relationship between a doctor blade and depressions on a forming roll in the system of FIG. 15.

FIG. 16 is an enlarged partial cross-sectional view depicting one relationship between a doctor blade 42 and exterior surface 32 with depressions 34 in a forming roll 30. The roll 30 rotates such that the exterior surface 32 is moving past the doctor blade 42 in the direction shown by the arrow. The molten thermoplastic composition 41 in the depicted embodiment is incident on the upper surface of the doctor blade 42 and flows down that surface towards the interface between the doctor blade 42 and the exterior surface 32 of the roll 30. Alternatively, the molten thermoplastic composition flow could be adjusted such that it flows directly into the interface between the doctor blade 42 and the roll 30.

As the depressions pass underneath the doctor blade 42, they are preferably filled with the molten thermoplastic composition 41 as seen in FIG. 16. In the depicted embodiment, the flow of molten thermoplastic composition 41 is preferably adjusted such that it is equivalent to the volume of the depressions 34 passing underneath the doctor blade 42. The result is that only a limited amount or none of the thermoplastic composition material accumulates at the interface of the roll 30 and the doctor blade 42.

Achieving that result may involve controlling the temperature of the roll 30 along with one or more of the following: doctor blade temperature, molten thermoplastic composition temperature, roll speed, flow rate of the molten thermoplastic composition, the pressure or force exerted on the forming roll 30 by the doctor blade 42, etc.

Figure 17:
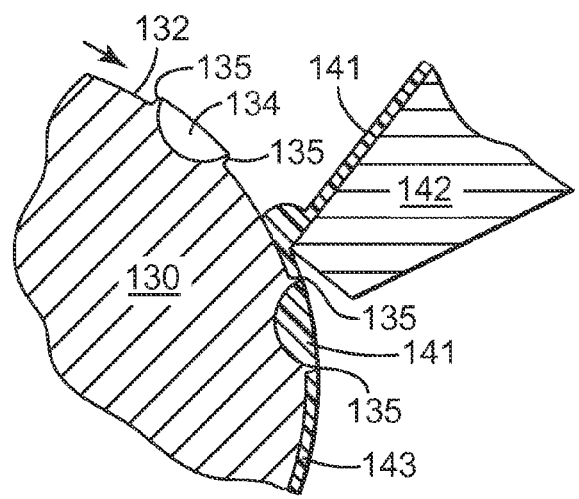
FIG. 17 is an enlarged schematic diagram depicting one relationship between a doctor blade and depressions on a forming roll in the system of FIG. 15 in which a base film is formed on the exterior surface of the forming roll.

Another optional feature depicted in FIG. 16 is that the molten thermoplastic composition 41 is largely removed from the exterior surface 32 of the roll 30 by the doctor blade 42. As such, the molten thermoplastic composition in the depressions 34 that have passed the doctor blade 42 is limited to the depressions only. In contrast, FIG. 17 depicts an alternative process in which a layer 143 of the molten thermoplastic composition 141 remains on the exterior surface 132 of the roll 130 after the depressions have passed the doctor blade 142. That layer 143 can be used to form the base films described in connection with FIGS. 2 and 3 above. Control over the formation of a base film in the systems and methods of the present invention may be achieved by adjusting, e.g., roll temperature, doctor blade temperature, molten thermoplastic composition temperature, roll speed, flow rate of the molten thermoplastic composition, the pressure or force exerted on the forming roll by the doctor blade, the spacing between the depressions, the volume of the depressions, etc.

Another optional feature depicted in connection with FIG. 17 is the addition of a ridge 135 around at least a portion of the perimeter of the depressions 134. The ridge 135 is raised above the exterior surface 132 of the roll 130. One potential advantage of the raised ridge 135 is that it may facilitate removal of a base film from polymeric structures on a substrate by providing a thinner area of weakness around the perimeter of the polymeric structure.

Returning to FIG. 15, with the depressions at least partially filled with the desired molten thermoplastic composition, the forming roll 30 continues to rotate until the depressions and the molten thermoplastic composition they contain are forced into contact with the substrate 10 against backup roll 20 at the transfer nip (i.e., the nip formed by the forming roll 30 and the backup roll 20). It is at this point that transfer of the molten thermoplastic composition in the depressions to the substrate 10 begins. By controlling the roll temperature to a point below the melt processing temperature of the thermoplastic composition, the thermoplastic composition in the depressions may preferably release cleanly from the depressions such that substantially all of the thermoplastic composition in the depressions is transferred to the substrate 10.

When a substrate 10 that includes one or more porous major surfaces on which the molten thermoplastic composition is deposited is used in connection with the methods of the present invention, a mechanical bond may preferably be formed by infiltration of the molten thermoplastic composition into the porous surface of the substrate 10. As used in connection with the present invention, the term "porous" includes both structures that include voids formed therein, as well as structures formed of a collection of fibers (e.g., woven, nonwoven or knit) that allow for the penetration of molten thermoplastic compositions. If the substrate 10 is not porous but is made of a thermoplastic composition, attachment of the polymeric structures may be achieved by intermixing as described herein.

The nip pressure between the forming roll 30 and the backup roll 20 is preferably sufficient to result in attachment of the thermoplastic composition in the depressions of the roll 30 to the substrate 10. If the substrate surface is porous, a portion of the thermoplastic composition in the polymeric structures infiltrates and/or encapsulates a portion of the porous substrate 10 to improve attachment of the polymeric structures to the substrate 10. Where the surface of the substrate 10 includes fibers (e.g., where the substrate 10 includes woven, nonwoven, or knit materials on its major surfaces), it may be preferred that the thermoplastic composition encapsulate all or a portion of at least some of the fibers on the surface of the substrate 10 to improve attachment of the polymeric structures to the substrate 10.

Under some conditions the molten thermoplastic composition in the depressions 34 may completely permeate the substrate 10 if, e.g., the substrate 10 is porous throughout its thickness. In other instances, penetration of the molten thermoplastic composition may be limited to the outer layer or layers of the substrate 10.

It should, however, be understood that although the outer surfaces of the substrate 10 may exhibit some porosity, that porosity may not necessarily extend through the entire thickness of the substrate 10. For example, the substrate 10 may have a variety of different layers, with one of the layers being substantially non-porous. In another alternative, the overall thickness of the substrate 10 may render it non-porous as a whole, even though the outer surfaces of the substrate 10 exhibit some porosity as discussed above.

The backup roll 20 may possess a variety of different characteristics depending on the types of substrate materials and/or molten thermoplastic compositions being processed. In some instances, the exterior of the backup roll 20 may be a rubber or other conformable material that conforms to the shape of the forming roll 30. If a conformable material such as rubber is used, it may, e.g., have a durometer of, e.g., about 10–90 Shore A.

Figure 18:
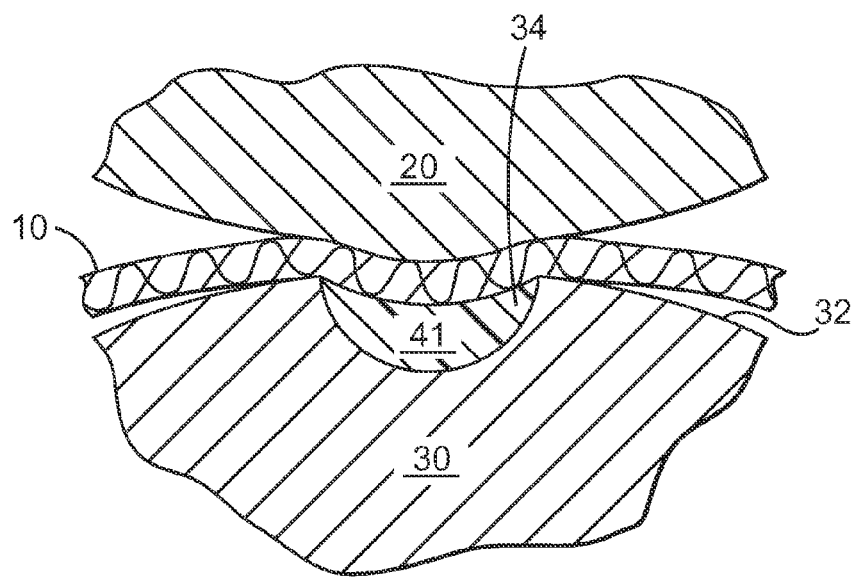
FIG. 18 is an enlarged partial cross-sectional view depicting a conformable backup roll forcing a substrate against a forming roll.

One such variation at the transfer nip is depicted in the enlarged cross-sectional view of FIG. 18, in which a conformable backup roll 30 is depicted as forcing a portion of the substrate 10 into the depression 34 (and the thermoplastic composition 41 contained therein). If the surface of the substrate 10 facing the depression 34 is porous, a portion of the molten thermoplastic composition 41 may be forced in the porous surface of the substrate 10. Forcing the substrate 10 into the depression may be particularly beneficial if the depression 34 is not completely filled with the molten thermoplastic composition 41 to improve the likelihood of contact between the substrate 10 and the molten thermoplastic composition 41.

Other backup rolls may also be used in connection with the present invention. For example, the backup roll may have mating protrusions that act to force the substrate into the depressions. In another alternative, the backup roll may have a structured (as opposed to a smooth) surface such that increased pressure is applied to the substrate 10 only where the backup roll has a raised structure. For example, the backup roll may have a corrugated surface or other wise include ribs, posts, etc. to achieve differential bonding of the polymeric structures formed in the depressions to the substrate 10.

By controlling the temperature of the forming roll as discussed above, transfer of the thermoplastic composition 41 in the depression 34 may be enhanced because the cooler roll temperature preferably results in freezing or solidification of the thermoplastic composition directly adjacent the surfaces of the depression 34, while an amount of the thermoplastic composition 41 that is furthest from the surfaces of the depression 34 remains sufficiently molten to accomplish desired attachment to the substrate 10. Release of the thermoplastic composition from the depressions 34 and/or the exterior surface 32 of the roll 30 may be enhanced if those surfaces are coated with low surface energy materials (e.g., fluoroethylenes, etc.).

In addition to controlling the temperature of the forming roll, it may also be beneficial to control the temperature of the backup roll 20. For example, it may be desirable to heat or cool the surface of the backup roll 20 to a selected temperature.

Although the system and method depicted in FIG. 15 produces composite webs with polymeric structures on only one major side thereof, polymeric structures may be provided on both major surfaces of the substrate in accordance with the principles of the present invention. One example may include, e.g., forming polymeric structures on one surface of each of two separate substrates, with the two substrates then being laminated together to form a single substrate with polymeric structures on both major surfaces (see, e.g., FIG. 14). Alternatively, a single substrate may be directed into a nip formed by two forming rolls, with each of the forming rolls depositing polymeric structures on both sides of the web essentially simultaneously.

Figure 19:
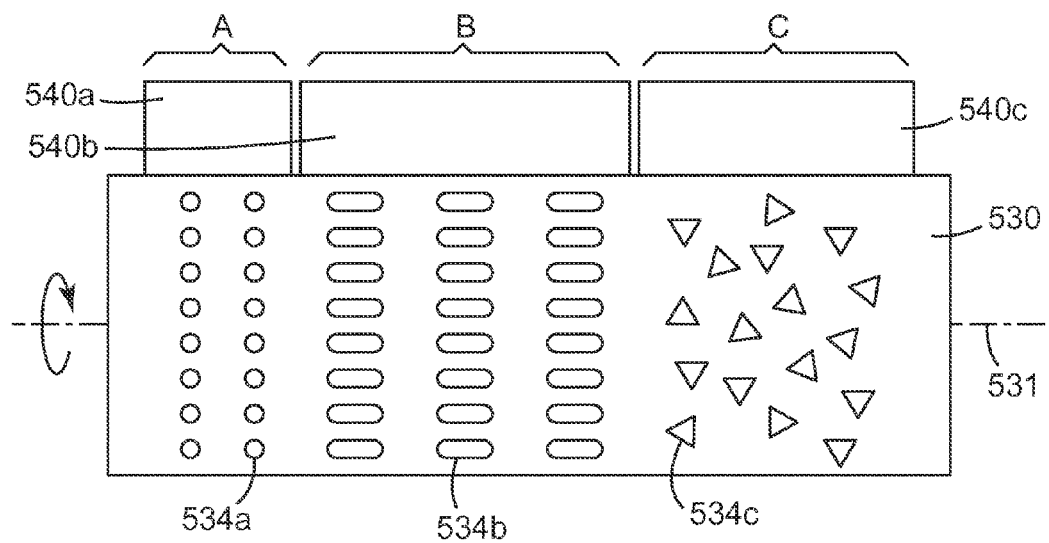
FIG. 19 illustrates another forming roll and polymer source useful in connection with zoned delivery systems and methods.

Although FIG. 15 depicts the application of only one thermoplastic composition using the forming roll 30, it will be understood that two or more different thermoplastic compositions may be applied to the exterior surface of the forming roll 30. FIG. 19 depicts a portion of one system in which three molten thermoplastic compositions (in zones A, B, & C) are delivered to different portions of the surface of a forming roll 530 that rotates about an axis 531. If extruders 540a, 540b and 540c are used, the different thermoplastic compositions may be delivered in a manner such that molten thermoplastic compositions in the different zones do not mix during processing.

The forming roll 530 also includes different sets of depressions 534a, 534b, and 534c over which the different molten thermoplastic compositions may be applied. The depressions in the different zones on forming roll 530 are differently shaped, have different sizes, and have different spacing. For example, the triangular depressions in zone C are arranged in an irregular, non-repeating pattern while the depressions in zones A & B are arranged in regular, repeating patterns.

With the system of FIG. 19, different sets of polymeric structures may be formed on a single substrate or different substrates using different thermoplastic compositions. As a result, the thermoplastic compositions may be selected for any of a number of different properties related to manufacturing or end-use performance of the finished articles made using the composite webs.

Figure 20:
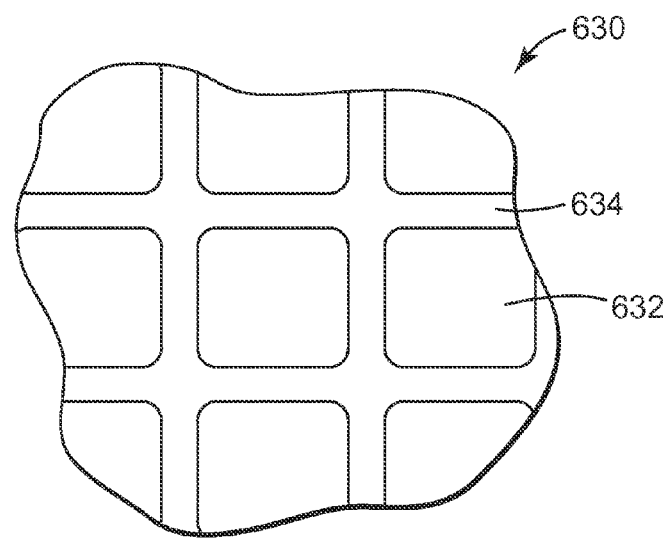
FIG. 20 is a plan view of a portion of an exterior surface of a forming roll comprising a patterned depression formed therein.

FIG. 20 is a plan view of a portion of a forming roll 630 that may be used in connection with the present invention. The roll 630 includes an exterior surface 632 with a patterned depression 634 formed therein. The depression 634 may be, e.g., in the form of intersecting troughs such that a screen-like pattern is formed.

Figure 21:
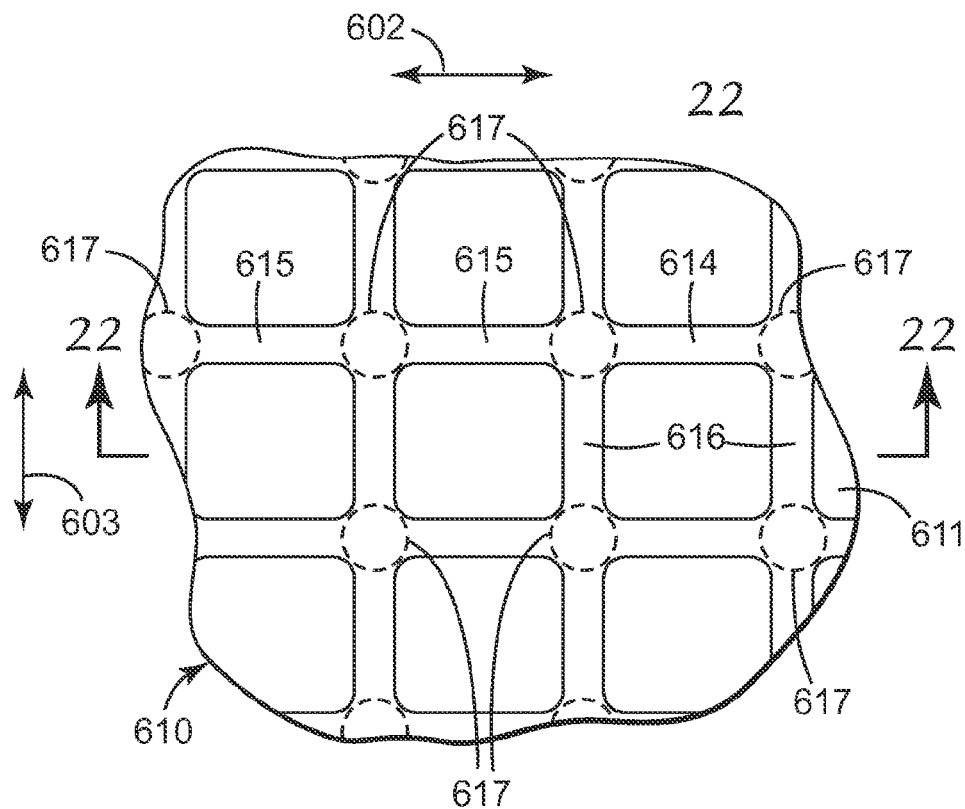
FIG. 21 is a plan view of a composite web including a polymeric structure formed thereon using the forming roll of FIG. 20.
Figure 22:
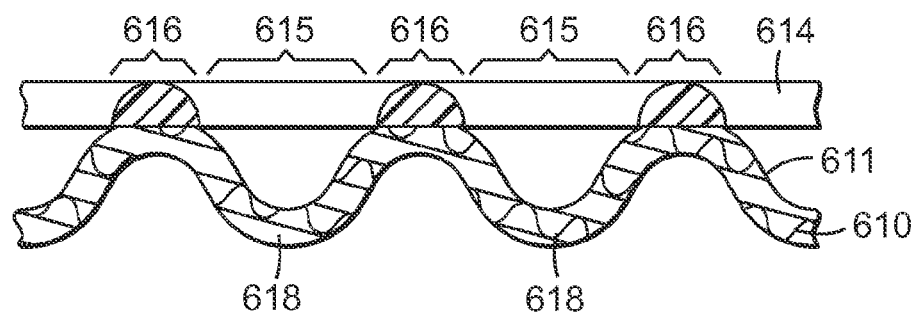
FIG. 22 is a cross-sectional view of the composite web of FIG. 21 after stretching.

FIGS. 21 and 22 depict a composite web that may be manufactured using the forming tool 630 of FIG. 20, with FIG. 21 being a plan view of the article and FIG. 22 being a cross-sectional view of the composite web taken along line 22—22 in FIG. 21. The polymeric structure 614 includes segments 616 that are attached to the surface 611 of the substrate 610 (see, e.g., FIG. 22) and segments 615 that are not attached to the surface 611 of the substrate 610. It may be preferred that the portions 618 of the substrate 610 opposite the unattached segments 615 form arcuate channels spaced from the polymeric structure 614.

Also, although not depicted, all or portions of the polymeric structure 614 may include surface features formed on the upper surface thereof (as described in connection with, e.g., FIGS. 12 and 13).

The composite web of FIGS. 21 and 22 may be formed by, e.g., transferring an elastomeric thermoplastic composition to the substrate 610. The elastomeric thermoplastic composition may preferably form a polymeric structure 614 that exhibits elasticity. It may further be preferred that the polymeric structure 614 exhibit differential bonding to the substrate 610 such that portions of the substrate 610 are attached more securely to the polymeric structure 614 than other portions. For example, it may be preferred that the intersections between the various strands or segments of the polymeric structure 614 be attached more securely than the intervening segments. These more secure attachment points may be the result of a locally increased mass of molten thermoplastic composition as discussed above in connection with FIGS. 6–13.

In addition, it may be preferred that the substrate 610 be manufactured of a non-elastomeric material or an elastic material that has a yield point below that of the elastomeric polymeric structure 614. After transfer of the thermoplastic composition, the substrate 610 (with the polymeric structure 614 formed thereon) can be stretched in the directions of arrow 602 (see FIG. 21). The stretching is preferably sufficient to cause the substrate 610 to release from the polymeric structure 614 along at least some of the segments 615 and result in the gathers or puckers seen in FIG. 22.

The stretching is also preferably sufficient to cause permanent elongation of the substrate 610 that provides the additional length needed to form the arcuate portions 618 after the stretching force is released. The polymeric structure 614 itself may experience some permanent elongation as a result of the stretching, but its magnitude will be below that of the substrate such that the arcuate portions 618 are formed as seen in FIG. 22.

Although the substrate 610 is preferably extensible, a nonextensible substrate 610 can be made extensible by, e.g., providing slits in the substrate. The slits may preferably be spanned by the elastomeric polymeric structure 614. Some exemplary slitting processes to provide or improve extensibility of a substrate are described in International Publication No. WO 96/10481 (Abuto et al.). Other techniques may also be used to provide or improve the extensibility of substrates used in connection with the present invention. For example, the mechanical stretching processes described in U.S. Pat. No. 4,223,059 (Schwarz) and U.S. Pat. No. 5,167,897 (Weber et al.) may be used to provide or improve extensibility.

In addition to stretching in direction 602, it may also be beneficial to stretch the composite web in the direction of arrow 603 in FIG. 21. The resulting two-dimensional stretching may cause the substrate to permanently elongate in both directions, with the substrate forming pillow-like structures between the intersection points in the polymeric structure 614.

As another alternative to obtain the composite web of FIG. 22, it may be possible to use a substrate 610 that is, itself, elastic. Such an elastic substrate may be stretched in the machine direction and/or one or more different directions before the polymeric structure 614 is transferred thereto.

After formation of the polymeric structures on the stretched elastic substrate 610, the substrate 610 may be allowed to relax such that the arcuate portions 618 are formed.

Composite webs such as those depicted in FIGS. 21 and 22 may be useful as, e.g., elastic components for disposable articles, diapers, incontinence devices, gowns, clothing, filtration devices, etc.

Figure 23:
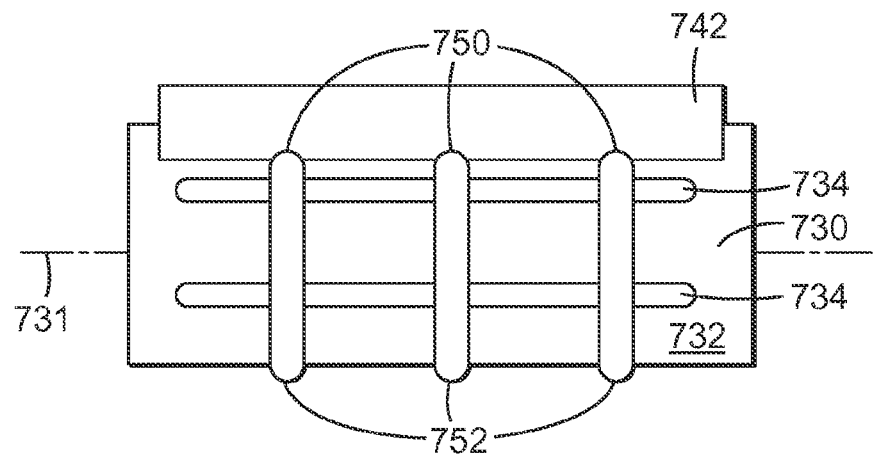
FIG. 23 is an alternative system for producing a polymeric structure on a composite web similar to that depicted in FIG. 20.

As an alternative to the patterned depression of FIG. 20, the polymeric structure 614 of FIGS. 21 and 22 may be formed by the system and method depicted in FIG. 23. The system includes a forming roll 730 with an exterior surface 732. A series of depressions 734 are formed in the exterior surface 732 of the forming roll 730. One feature illustrated in FIG. 23 is that the doctor blade 742 includes notches 750 such that, after wiping. a portion of the molten thermoplastic composition passes through the interface between the doctor blade 742 and the roll 730 and remains on the exterior surface 732 of the roll 730 in a series of strands 752 that extend around a portion of the circumference of the roll 730. In that manner, the cross-hatched pattern of FIGS. 21 and 22 can be obtained without requiring a patterned depression that corresponds precisely to the shape of the polymeric structure 614.

Figure 24:
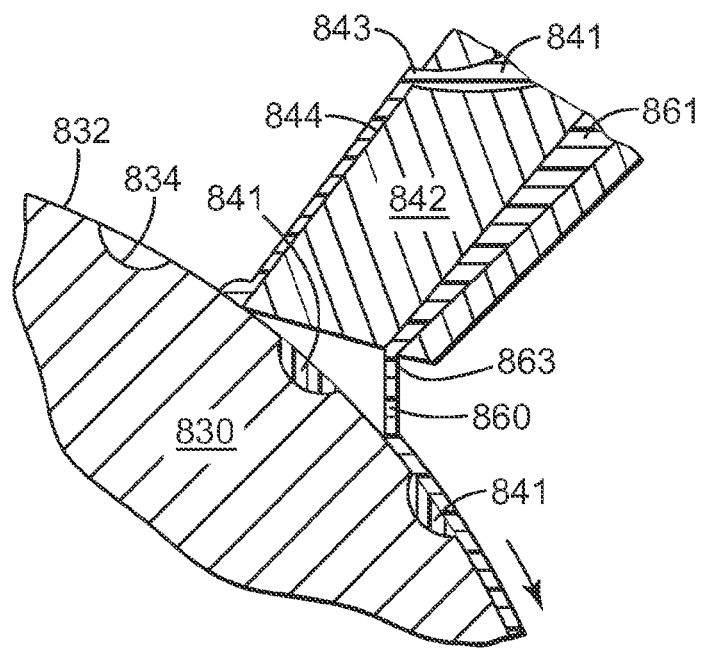
FIG. 24 is another alternative system for producing a polymeric structure on a composite web similar to that depicted in FIG. 20.

FIG. 24 depicts yet another system and method that may be used in connection with the present invention. The system includes a forming roll 830 with an exterior surface 832 and depressions 834 formed therein. In a manner similar to that described in connection with FIGS. 16 and 17, the system includes a doctor blade 842 that functions as an extrusion die in addition to a doctor blade. The doctor blade includes an orifice 843 from which a first molten thermoplastic composition 841 is extruded. The molten thermoplastic composition 841 flows down the face 844 of the doctor block 842 until it reaches the interface with the roll 830. At that point, the molten thermoplastic composition 841 fills the depressions 834.

In addition to the extrusion of molten thermoplastic composition 841, the doctor block 842 of FIG. 24 also includes an optional orifice 863 through which a second molten thermoplastic composition 861 flows onto the exterior surface 832 of the forming roll 830. The second molten thermoplastic composition 861 may preferably be provided in the form of generally continuous strands 860 as the roll 830 rotates in the direction of the depicted arrow. The second molten thermoplastic composition 861 may be the same as or different than the first molten thermoplastic composition 841.

Other variations include that the depressions 834 may be limited in size or they may extend across the roll face (as seen in, e.g., FIG. 23). If the depressions 834 extend across the roll face as seen in FIG. 23, then the system of FIG. 24 provides another alternative system and method form forming a polymeric structure such as that seen in FIGS. 21 and 22. One potential advantage of the system of FIG. 24 is that the molten thermoplastic compositions 841 and 861 may be different to supply, e.g., different properties to the resulting composite web.

Regardless of the method used to form the polymeric structure 614 of FIG. 21, the polymeric structure 614 may exhibit differential bonding as described herein due to the increased mass of thermoplastic composition at the intersections between the segments 615 and 616. Those areas of increased mass may form bonded areas 617 (see FIG. 21) that are securely attached to the substrate 610, while the segments 615 and 616 may or may not be securely attached to the substrate 610, that is, they may be detached areas. The detached areas may be lightly attached to the substrate immediately after transfer of the polymeric structure thereto, but become detached from the substrate 610 after stretching or other physical manipulation (e.g., bending, flexing, etc.). Alternatively, the detached areas may be formed by thermoplastic composition that falls below the melt processing temperature before contacting the substrate 610 such that no bond is formed during transfer of the polymer structure 614 to the substrate.

FIGS. 25A–25E depict alternate composite web constructions in which two different thermoplastic compositions in different polymeric structures are transferred to a substrate or in which the same thermoplastic composition is applied in two different structures on a substrate. The constructions are provided to illustrate that the transfer methods of the present invention can be used to provide different polymeric structures that overlap each other on the same area of the substrate in some manner. In one example, one of the polymeric structures may exhibit elastic behavior while the other does not.

Although only two different structures are depicted in each figure, it will be understood that more than two different polymeric structures could be provided. Also, surface features such as those depicted in FIG. 13 may be provided on the polymeric structures if so desired. Furthermore, although only one set of polymeric structures is depicted in each figure, each composite wed may include a plurality of the same or different polymeric structures. The different polymeric structures may, for example, be applied by successive stations such as the station depicted in FIG. 15.

Figure 25A:
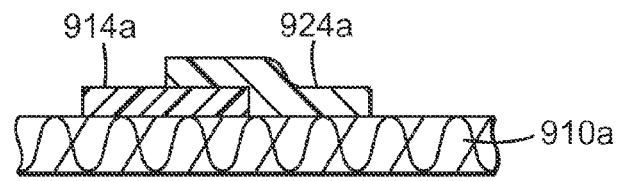
FIGS. 25A–25E are cross-sectional views of portions of alternative composite webs with two different thermoplastic compositions located on a surface of a substrate.

FIG. 25A depicts a first polymeric structure 914*a* on the substrate 910*a* and a second polymeric structure 924*a* that is located on both the substrate 910*a* and the first polymeric structure 914*a*. The second polymeric structure 924*a* may be attached to the first polymeric structure 914*a* or not as desired.

Figure 25B:
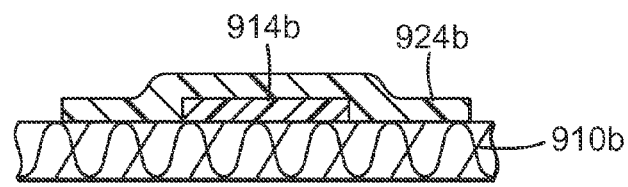

FIG. 25B depicts a first polymeric structure 914*b* on the substrate 910*b* and a second polymeric structure 924*b* that is located on both the substrate 910*b* and over the first polymeric structure 914*b*. The second polymeric structure 924*b* is depicted as attached to the upper surface of the first polymeric structure 914*b*.

Figure 25C:
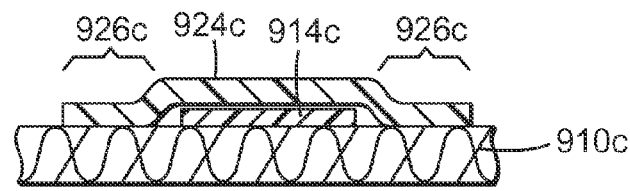

FIG. 25C depicts a first polymeric structure 914*c* on the substrate 910*c* and a second polymeric structure 924*c* that is attached to the substrate 910*c* in areas 926*c* and that extends over the first polymeric structure 914*c*. The second polymeric structure 924*c* is depicted as detached from the upper surface of the first polymeric structure 914*c*.

Figure 25D:
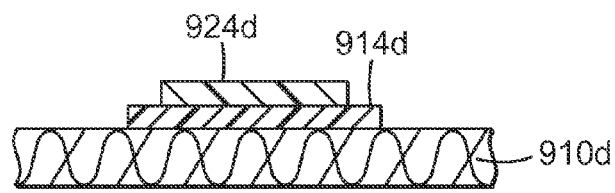

FIG. 25D depicts a first polymeric structure 914*d* attached directly to the substrate 910*d* and a second polymeric structure 924*d* that is located on only the first polymeric structure 914*d*, that is, within the footprint of the first polymeric structure 914*d* on the substrate 910*d*. The second polymeric structure 924*d* is depicted as attached to the upper surface of the first polymeric structure 914*d*.

Figure 25E:
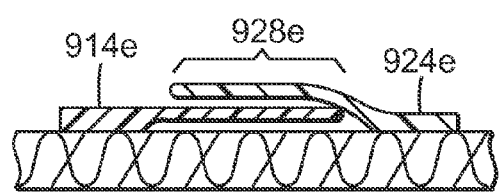
Figure 26A:
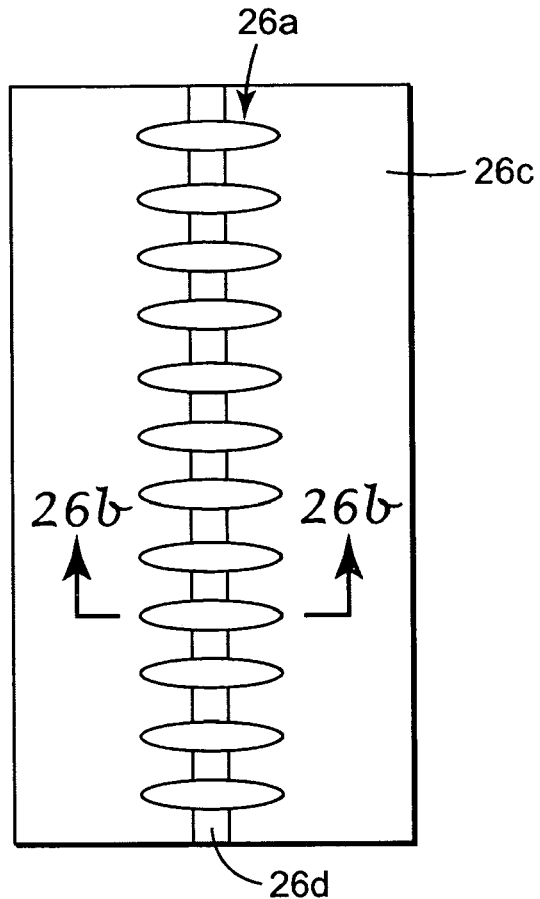
Figure 26B:
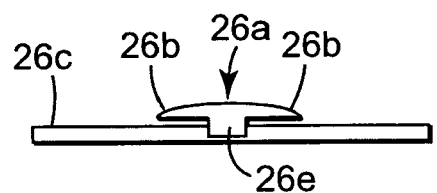
Figure 27A:
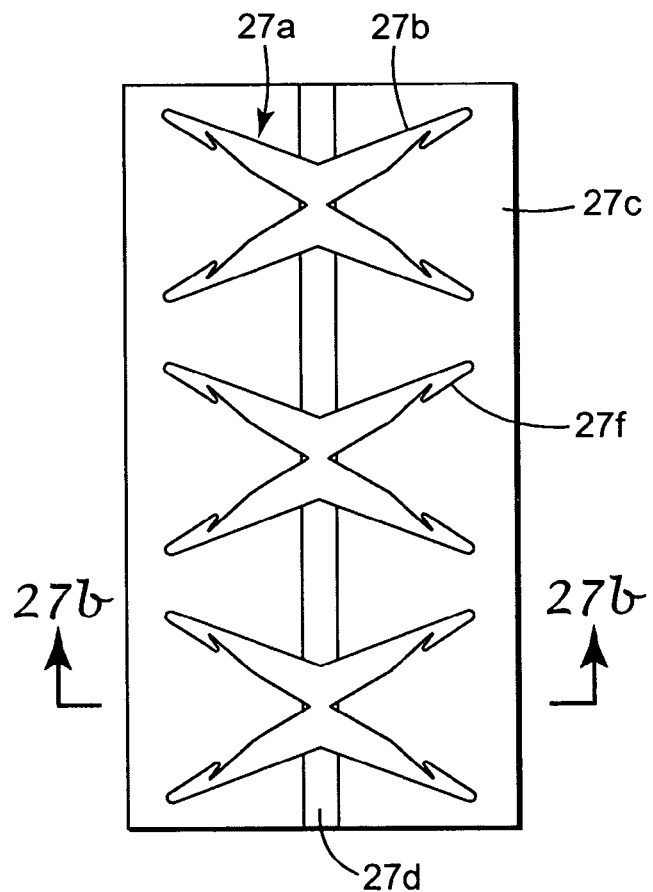
Figure 27B:
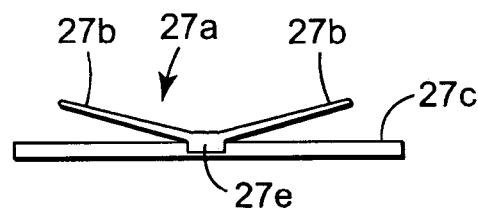
Figure 28A:
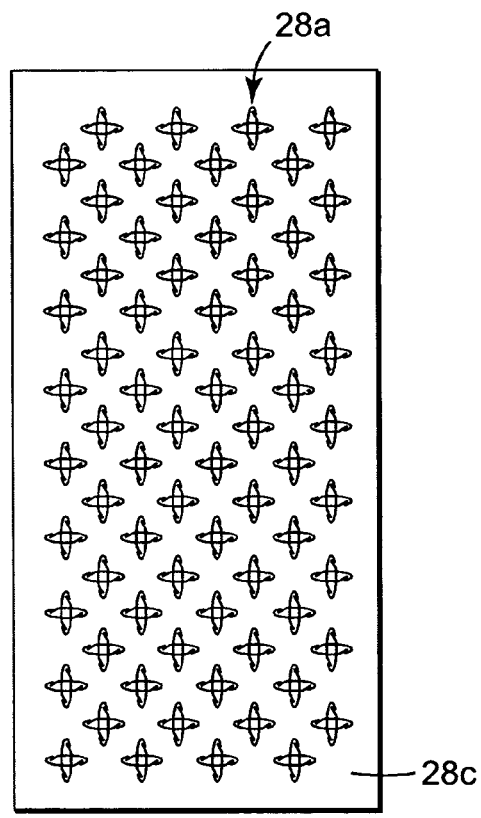
Figure 28B:
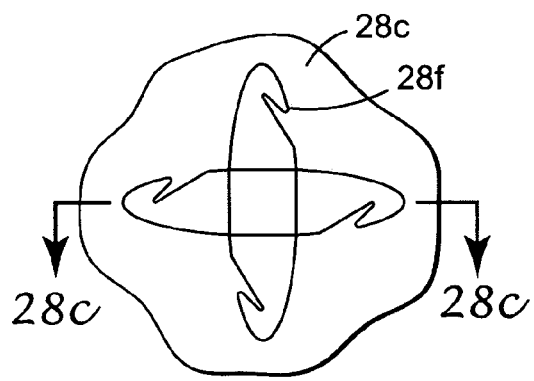
Figure 28C:
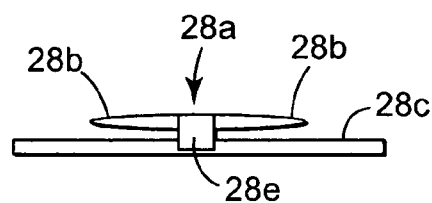
Figure 29A:
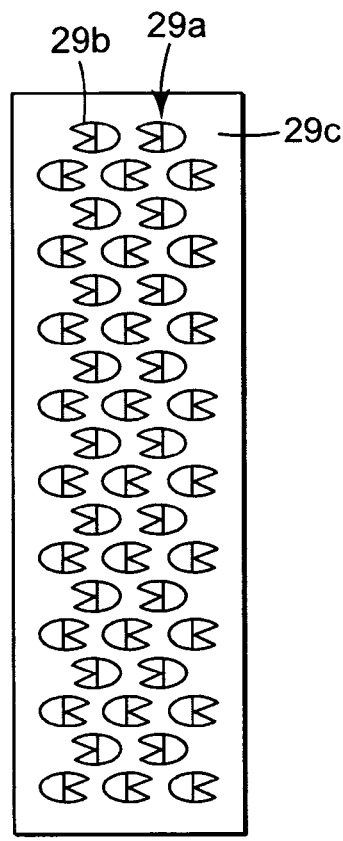
Figure 29B:
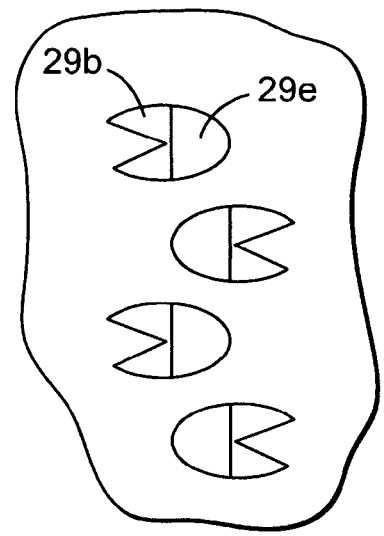
Figure 29C:
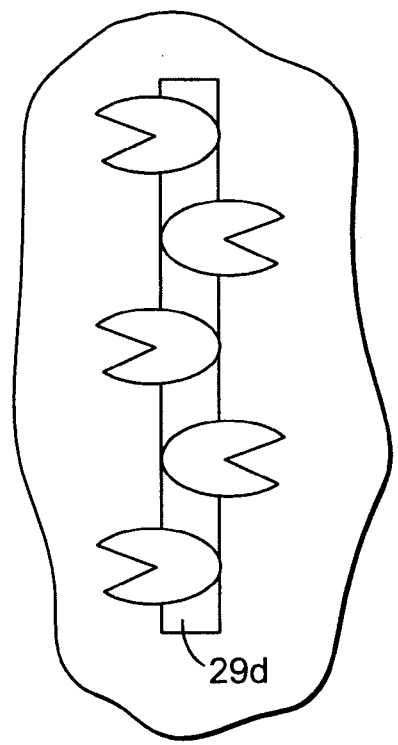
Figure 30:
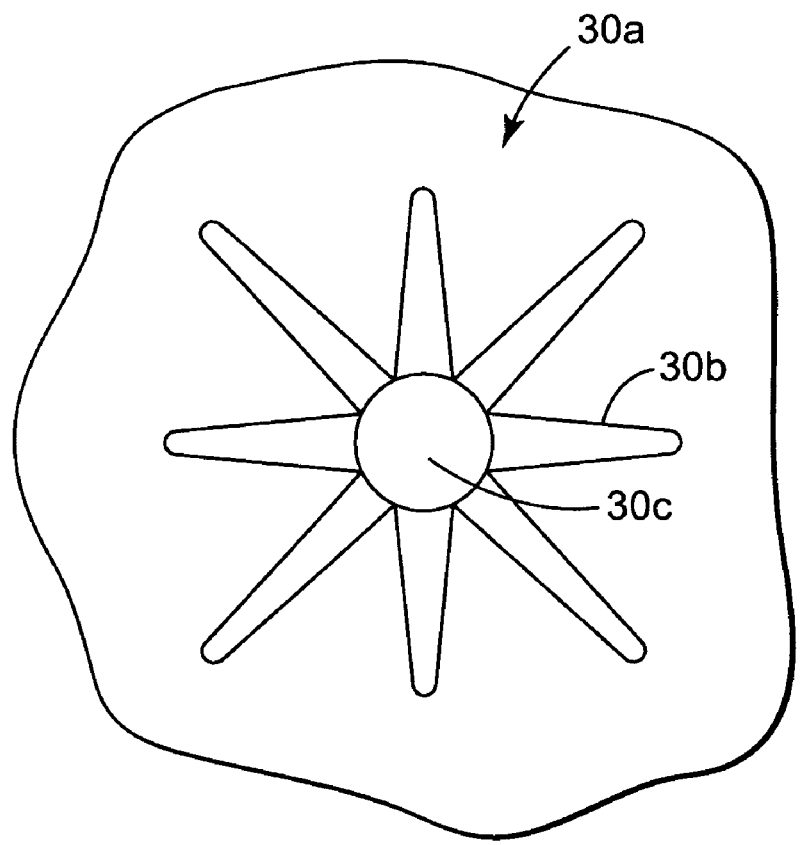
Figure 31A:
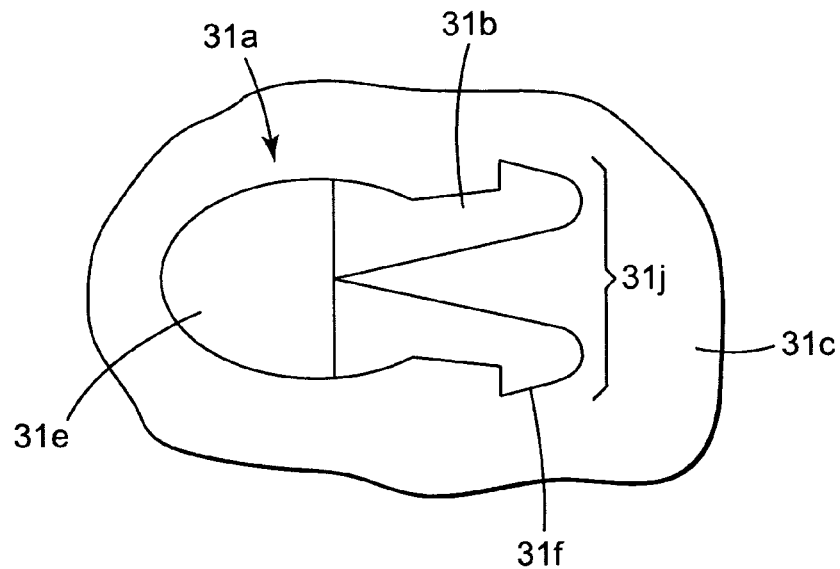
Figure 31B:
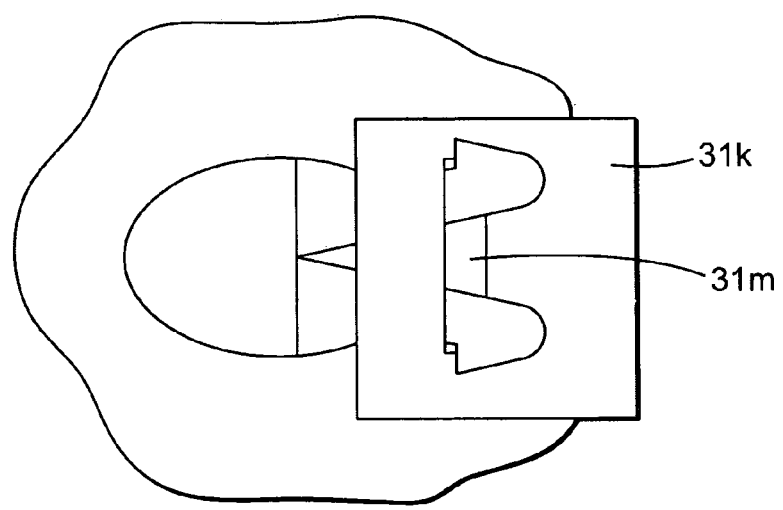
Figure 32A:
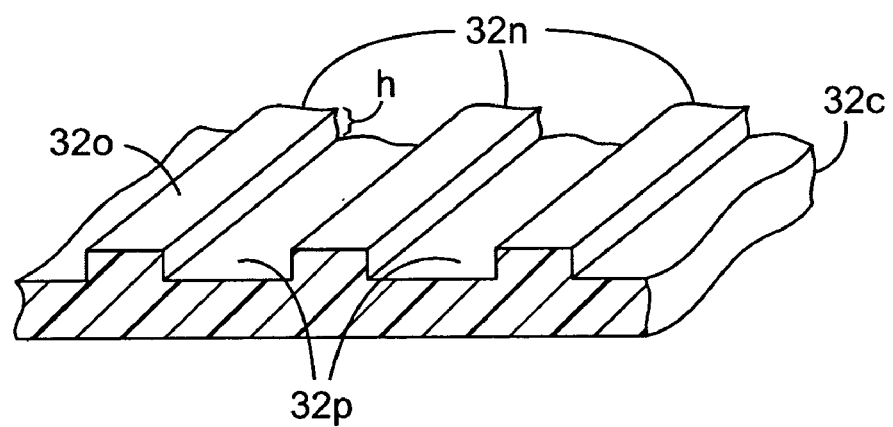
Figure 32B:
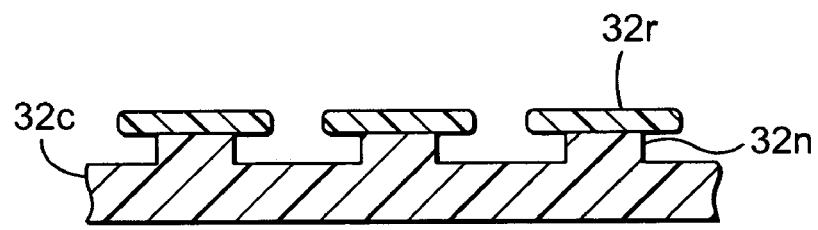
Figure 33A:
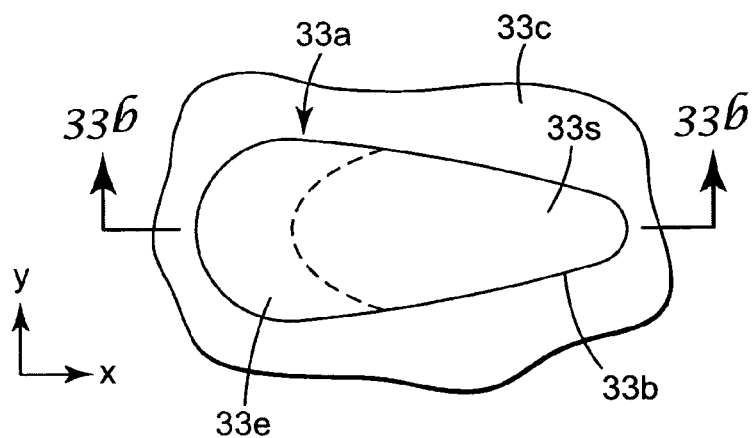
Figure 33B:
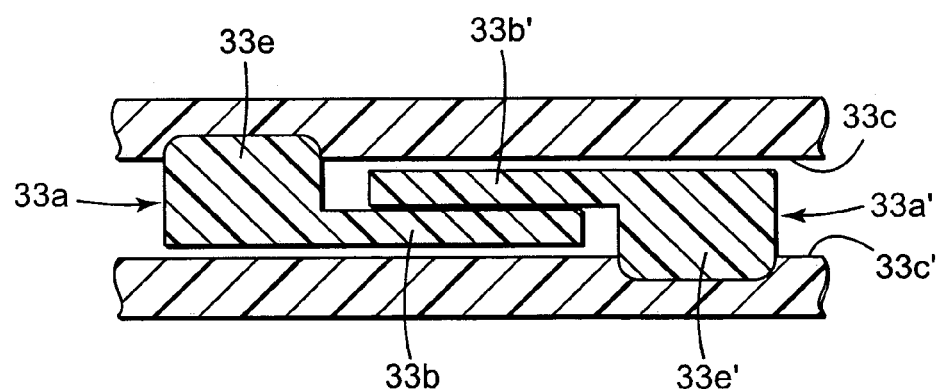

FIG. 25E depicts a first polymeric structure 914*e* and a second polymeric structure 924*e*, both attached to the substrate 910*e*. Both structures include detached portions that are generally located within area 928*e* in FIG. 25E. The first polymeric structure 914*e* includes a portion that is attached to the substrate 910*e* and a portion that is detached from the substrate 910*e*. The detached portion of the first polymeric structure 914*e* is generally located under a portion of the second polymeric structure 924*e*. The second polymeric structure 924*e* also includes a portion that is attached to the substrate 910*e* and a portion that is detached from the substrate 910*e*. The detached portion of the second polymeric structure 924*e* is generally located over the first polymeric structure 914*e*.

In addition to the deposition of nonelastic or elastic thermoplastic polymeric structures on a substrate, it is also contemplated that additional materials can be coated onto a major surface of the substrate using known methods. Such materials could be, for example adhesives, as described in, e.g., U.S. Pat. No. 5,019,071 (Bany et al.); U.S. Pat. No. 5,028,646 (Miller et al.); and U.S. Pat. No. 5,300,057 (Miller et al.); or cohesives as described in, e.g. U.S. Pat. No. 5,389,438 (Miller et al.) and U.S. Pat. No. 6,261,278 (Chen et al.).

EXAMPLE

The following examples are provided to enhance understanding of the present invention. The examples are not intended to limit the scope of the invention.

Example 1

A composite web was produced using a system similar to that shown in FIG. 15. A 40 mm diameter twin screw extruder fitted with a gear pump was used to deliver a molten polypropylene polymer (7C05N, Huntsman) at a melt temperature of approximately 246° C. to a die. The die was positioned such that a film of molten polymer was extruded vertically downward into the interface region of a heated doctor blade and a cooled forming roll.

The doctor blade was forced against the forming roll with a pressure of 93 pounds per lineal inch (163 Newtons per lineal cm) (a pressure which allowed the molten polymer to create a gap between the blade and the roll which defined the thickness of the base film). The doctor blade was maintained at a temperature of 246° C. and the forming roll was maintained at a temperature of 30° C. by circulating cooled oil through the interior of the roll.

The exterior surface of the forming roll was machined using a computer controlled milling machine to have a series of elongated elliptical or ring-shaped depressions with center islands, similar in shape to the depressions shown in FIG. 10. The depressions, however, had a constant depth. There were eight (8) depressions around the periphery of the roll. The depressions were elliptical in shape 8.825 cm long and 2.00 cm in width at the widest area. The long axis of each ellipse was oriented at an angle of 18 degrees to the machine direction (downweb). The ellipses were arranged with a center to center spacing of 12.1 cm. The elliptical depressions had a maximum depth of 0.80 mm around the entire ellipse and the sides of these depressions had a radius of 0.80 mm.

The rotation of the forming roll caused the doctor blade to wipe the molten polymer into these depressions while also allowing the formation of a base film layer (as shown in FIG. 17). After the wiping action of the doctor blade, the forming roll continued to rotate until the wiped polymer was forced into contact with a polypropylene nonwoven substrate (Product C0075 Style 3320 with a basis weight of 27 grams per square meter (gsm) from BBA Nonwovens) against a conformable backup roll (with a durometer of 75 Shore A) using a nip pressure of 14 pounds per lineal inch (25 Newtons/lineal cm).

A mechanical bond of the polymer in the elliptical depressions and the nonwoven substrate was achieved while no such bond was created between the base film and the substrate. The polymer, both that forming the base film and that forming the elliptical features released cleanly and essentially completely from the surface of the forming roll when the substrate was directed away from the forming roll. The thickness of the base film formed was 0.051 mm and the thickness of the elliptical regions (measuring both the substrate and the elliptical region) was 0.83 mm.

Example 2

A composite web was produced using a system similar to that shown in FIG. 15. A 40 mm diameter twin screw extruder fitted with a gear pump was used to deliver a molten polymer consisting of a styrene-ethylenebutylene-styrene block copolymer (KRATON G-1657) at a melt temperature of approximately 246° C. to a die. The die was positioned such that a film of molten polymer was extruded vertically downward into the interface region of a heated doctor blade and a cooled forming roll. The doctor blade was maintained at a temperature of 246° C. and the forming roll was maintained at a temperature of 30° C. by circulating cooled oil through the interior of the roll. The doctor blade was held against the forming roll with a pressure of 450 pounds per lineal inch (788 Newtons/lineal cm).

The exterior surface of the forming roll was machined using a computer controlled milling machine to have a series of six (6) different areas arranged around the periphery of the roll. Each of these areas comprised a series of cross-direction (CD) grooves (depressions) running in the cross-machine direction (parallel to the axis of the forming roll). Each of the six patterns had 30 CD grooves, each of which was 9 cm in length (in direction parallel to roll axis).

Among the six patterns, Area 1 was machined with CD grooves 1.241 mm wide, 0.2769 mm in depth and with center to center spacing between the grooves (measured in the machine-direction, i.e., perpendicular to the cross-direction grooves) of 4.033 mm. Area 2 included CD grooves 1.695 mm wide, 0.1727 mm in depth and with center to center spacing of 4.033 mm. Area 3 included CD grooves 1.645 mm wide, 0.2007 mm in depth, and with center to center spacing of 4.033 mm. Area 4 included CD grooves 1.531 mm wide, 0.2261 mm in depth, and with center to center spacing of 4.033 mm. Area 5 included CD grooves parallel to the roll axis 2.387 mm wide, 0.3023 mm in depth, and with center to center spacing of 4.033 mm. Area 6 included CD grooves 2.195 mm wide, 0.3531 mm in depth, and with center to center spacing of 4.033 mm.

In addition to the CD grooves formed in the roll, the doctor blade was machined to include fifteen (15) notches such that fifteen (15) strands of polymer were formed in the machine-direction (MD) on the exterior surface of the roll (as seen in FIG. 23). The notches were formed in the doctor blade as grooves (0.135 mm wide by 0.381 mm deep) with a center to center spacing measured in the cross-machine direction of 6.30 mm.

The polymer (KRATON G-1657) was transferred to a nonwoven polypropylene substrate (Product C0075 Style 3320 with a basis weight of 27 gsm from BBA Nonwovens) at a nip formed with a conformable backup roll (a steel core with a rubber cover having a durometer of 75 Shore A). The core of the backup roll was chilled by circulating water at a temperature of 5° C. The pressure exerted on the nip between the forming roll and the backup roll was 14 pounds per lineal inch (25 Newtons/lineal cm). The polymer in the grooves and on the surface of the roll released cleanly and essentially completely from the surface of the forming roll when the substrate was removed from the forming roll (as shown in FIG. 15).

The amount of polymer transferred within each of the six patterns showed different levels of penetration into the substrate. To illustrate this, the area of the resultant composite web that corresponded to the pattern of Area 3 exhibited a strong bond between the polymer and the substrate only in the areas where the MD strands (formed by the notched doctor blade) crossed the CD strands (formed by the polymer in the CD grooves). In these regions the polymer penetrated into the substrate and had encapsulated many of the fibers of the substrate. However, in the remainder of the polymer in the CD strands and the MD strands, i.e., the portions outside of the intersections, the polymer did not form a strong bond to the substrate. It appeared that there little or no penetration into the substrate by the polymer.

When a piece of the composite web corresponding to Area 3 was stretched in the CD direction (e.g. 100% elongation by hand) and released, the nonwoven substrate formed arcuate portions between the bond points that correspond to the intersections of the CD and MD strands as shown in FIG. 22. For the heavier patterns, such as Area 6 (in which the CD grooves were larger), the polymer penetrated the nonwoven substrate, encapsulating many of the fibers, over the entire length of the CD strands. When a piece of the web that corresponds to Area 6 was stretched in the CD direction and released, the substrate did not form arcuate portions as was seen in samples of the stretched composite web from Area 3. The composite web formed by each of the six patterns had good elasticity after an initial stretching and relaxation. For each of the six patterns, significant portions of the substrate between the CD strands and MD strands was substantially free of polymer, thus creating a highly breathable web (because the nonwoven substrate was itself highly breathable).

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated. Various modifications and alterations of this invention will become apparent to those skilled in the art without departing from the scope of this invention. It should be understood that this invention is not to be unduly limited to illustrative embodiments set forth herein.

The invention claimed is:

1. A method for producing a composite web, the method comprising:
    providing a forming tool comprising an exterior surface that comprises one or more depressions formed therein;
    delivering a molten thermoplastic composition onto the exterior surface of the forming tool;
    maintaining the exterior surface of the forming tool at a roll temperature that is below a melt processing temperature of the thermoplastic composition;
    wiping the molten thermoplastic composition on the exterior surface of the forming tool, wherein at least some of the molten thermoplastic composition enters the one or more depressions; transferring the thermoplastic composition in the one or more depressions to a substrate by contacting a first major surface of the substrate to the thermoplastic composition in the one or more depressions, wherein a portion of the thermoplastic composition in the one or more depressions that is proximate surfaces of the one or more depressions falls below the melt processing temperature of the thermoplastic composition after the depositing and before the thermoplastic composition in the one or more depressions contacts the first major surface of the substrate; and
    separating the substrate and the thermoplastic composition in the one or more depressions from the forming tool after the transferring, wherein a composite web is formed that comprises one or more polymeric structures of the thermoplastic composition located on the first major surface of the substrate.

2. A method according to claim 1, wherein a portion of the thermoplastic composition in the one or more depressions that is distal from surfaces of the one or more depressions remains at or above the melt processing temperature at least until the thermoplastic composition in the one or more depressions contacts the first major surface of the substrate.

3. A method according to claim 1, wherein the roll temperature is 20 degrees Celsius or more below a molten thermoplastic composition temperature at which the molten thermoplastic composition is delivered to the exterior surface of the forming tool.

4. A method according to claim 1, wherein delivering the molten thermoplastic composition onto the exterior surface of the forming tool comprises extruding the molten thermoplastic composition into an interface between the exterior surface of the forming tool and a doctor blade.

5. A method according to claim 1, wherein delivering the molten thermoplastic composition onto the exterior surface of the tuning tool comprises extruding the molten thermoplastic composition onto a doctor blade, wherein the molten thermoplastic composition flows down a surface of the doctor blade to an interface between the doctor blade and the exterior surface of the roll.

6. A method according to claim 1, wherein the first major surface of the substrate comprises a porous surface, and wherein the transferring further comprises forcing a portion of the first major surface of the substrate against the thermoplastic composition in the one or more depressions, wherein a portion of the thermoplastic composition in at least some depressions of the one or more depressions infiltrates the porous surface.

7. A method according to claim 3, wherein the porous surface of the substrate comprises fibers, and further wherein the transferring further comprises encapsulating at least a portion of at least some of the fibers in the thermoplastic composition in the one or more depressions.

8. A method according to claim 1, wherein the first major surface of the substrate comprises fibers, and further wherein the transferring further comprises encapsulating at least a portion of at least some of the fibers in the thermoplastic composition in the one or more depressions by forcing the first major surface of the substrate against the thermoplastic composition in the one or more depressions.

9. A method according to claim 1, wherein the substrate comprises polymeric material with a melt processing temperature at or below the melt processing temperature of the thermoplastic composition in the one or more depressions.

10. A method according to claim 1, wherein the thermoplastic composition comprises one or more elastomeric polymeric components such that the one or more polymeric structures on the substrate exhibit elastic behavior.

11. A method according to claim 1, wherein the thermoplastic composition comprises one or more elastomeric polymeric components such that the one or more polymeric structures on the substrate exhibit elastic behavior, and wherein the method further comprises stretching the composite web with the one or more polymeric structures located thereon such that the substrate exhibits permanent elongation after the stretching.

12. A method according to claim 1, wherein the thermoplastic composition comprises one or more elastomeric polymeric components such that the one or more polymeric structures on the substrate exhibit elastic behavior, and wherein the substrate comprises an elastic substrate, and further wherein the method comprises stretching the elastic substrate before contacting the first major surface of the web with the thermoplastic composition in the one or more depressions.

13. A method according to claim 1, wherein the wiping leaves at least some of the molten thermoplastic composition on the exterior surface of the forming tool outside of the one or more depressions.

14. A method according to claim 1, wherein depositing the molten thermoplastic composition on the exterior surface of the forming tool comprises depositing two or more different molten thermoplastic compositions on the exterior surface of the forming tool.

15. A method according to claim 1, wherein at least some of the one or more depressions comprise cavities formed therein, wherein the one or more polymeric structures formed by the one or more depressions comprise surface features located on an upper surface thereof.

16. A method according to claim 15, wherein the surface features are formed at the same time as the one or more polymeric structures.

* * * * *